(12) United States Patent
Zhang et al.

(10) Patent No.: US 12,375,151 B2
(45) Date of Patent: Jul. 29, 2025

(54) BEAM FAILURE RECOVERY VIA SIDELINK

(71) Applicant: QUALCOMM Incorporated, San Diego, CA (US)

(72) Inventors: Qian Zhang, Basking Ridge, NJ (US); Yan Zhou, San Diego, CA (US); Jelena Damnjanovic, Del Mar, CA (US); Shanyu Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 532 days.

(21) Appl. No.: 17/848,285

(22) Filed: Jun. 23, 2022

(65) Prior Publication Data

US 2023/0421230 A1 Dec. 28, 2023

(51) Int. Cl.
| | | |
|---|---|---|
| *H04B 7/06* | (2006.01) | |
| *H04B 7/08* | (2006.01) | |
| *H04W 72/02* | (2009.01) | |
| *H04W 74/0833* | (2024.01) | |
| *H04W 76/19* | (2018.01) | |

(52) U.S. Cl.
CPC .......... *H04B 7/0695* (2013.01); *H04W 72/02* (2013.01); *H04W 74/0833* (2013.01); *H04W 76/19* (2018.02)

(58) Field of Classification Search
CPC ..... H04B 7/0695; H04B 7/088; H04W 72/02; H04W 74/0833; H04W 76/19
See application file for complete search history.

(56) References Cited

U.S. PATENT DOCUMENTS

| | | | | |
|---|---|---|---|---|
| 11,539,575 | B2* | 12/2022 | Kim | H04W 72/23 |
| 2019/0110281 | A1* | 4/2019 | Zhou | H04W 76/19 |
| 2021/0100059 | A1* | 4/2021 | Xu | H04B 7/06954 |
| 2021/0160851 | A1* | 5/2021 | Akkarakaran | H04W 76/14 |
| 2022/0337472 | A1* | 10/2022 | Turtinen | H04B 7/0695 |
| 2023/0084028 | A1* | 3/2023 | Karimidehkordi | H04B 7/06964 370/216 |
| 2023/0300935 | A1* | 9/2023 | Hu | H04B 7/0626 370/329 |
| 2023/0337312 | A1* | 10/2023 | Turtinen | H04L 5/0053 |
| 2024/0155596 | A1* | 5/2024 | Ganesan | H04B 7/0623 |
| 2024/0388351 | A1* | 11/2024 | Säily | H04B 7/06952 |
| 2024/0396627 | A1* | 11/2024 | Jia | H04L 5/0048 |

* cited by examiner

*Primary Examiner* — Harry H Kim
(74) *Attorney, Agent, or Firm* — Holland & Hart LLP

(57) ABSTRACT

Methods, systems, and devices for wireless communications are described. A first user equipment (UE) may communicate with a network node via a first wireless link using a first beam according to a first beam configuration. In some examples, the first UE may transmit to the network node via a second wireless link with a second UE, a beam failure recovery (BFR) message in response to identifying a beam failure for the first beam. As such, the UE may receive, a message indicating a second beam configuration. For example, the network node transmit to the first UE via a third wireless link, the second beam configuration including a second beam for the first UE to use to communicate. Additionally, or alternatively, the network node may transmit to the second UE, a signal indicating for the second UE to relay traffic between the network node and the first UE.

29 Claims, 18 Drawing Sheets

BEAM FAILURE RECOVERY VIA SIDELINK

FIELD OF TECHNOLOGY

The present disclosure relates to wireless communications, including beam failure recovery (BFR) via sidelink.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support beam failure recovery (BFR) via sidelink. For example, the described techniques provide for a network to reduce the use of a random access procedure for instances of beam failure recover by utilizing sidelink. For example, a first user equipment (UE) may determine one or more second UEs associated with a network node that may be used as candidate sidelink UEs that may relay a BFR message transmitted by the first UE. In some examples, the network node may preconfigure and signal a list of the candidate sidelink UEs to the first UE. As such, the first UE may signal sidelink control information (SCI) to one or more of the candidate UEs.

Based on the network node receiving the BFR message, the network node may determine whether the first UE is still within geographic coverage. If the first UE is not within geographic coverage, the network node may set up radio resource control (RRC) sidelink connection with a candidate UE such that the candidate UE may relay traffic from the network node to the first UE via sidelink. Additionally, or alternatively, the first UE may transmit a message of a random access procedure (e.g., a random access channel (RACH) procedure) to a second candidate network node, or otherwise initiate or perform a random access procedure with the second candidate network node. The candidate network node may then signal to the network node to cancel traffic with the first UE. If the first UE is within geographic coverage, the network node may indicate a new beam for use at the first UE.

A method for wireless communications at a first user UE is described. The method may include communicating with a network node via a first wireless link using a first beam according to a first beam configuration, transmitting, to the network node via a second wireless link with a second UE, a BFR message in response to identifying a beam failure for the first beam associated with the first wireless link, and receiving, at least in part in response to the BFR message, a control message indicating a second beam configuration for the first UE to use to communicate with the network node.

An apparatus for wireless communications at a first UE is described. The apparatus may include a processor, memory coupled with the processor, and instructions stored in the memory. The instructions may be executable by the processor to cause the apparatus to communicate with a network node via a first wireless link using a first beam according to a first beam configuration, transmit, to the network node via a second wireless link with a second UE, a BFR message in response to identifying a beam failure for the first beam associated with the first wireless link, and receive, at least in part in response to the BFR message, a control message indicating a second beam configuration for the first UE to use to communicate with the network node.

Another apparatus for wireless communications at a first UE is described. The apparatus may include means for communicating with a network node via a first wireless link using a first beam according to a first beam configuration, means for transmitting, to the network node via a second wireless link with a second UE, a BFR message in response to identifying a beam failure for the first beam associated with the first wireless link, and means for receiving, at least in part in response to the BFR message, a control message indicating a second beam configuration for the first UE to use to communicate with the network node.

A non-transitory computer-readable medium storing code for wireless communications at a first UE is described. The code may include instructions executable by a processor to communicate with a network node via a first wireless link using a first beam according to a first beam configuration, transmit, to the network node via a second wireless link with a second UE, a BFR message in response to identifying a beam failure for the first beam associated with the first wireless link, and receive, at least in part in response to the BFR message, a control message indicating a second beam configuration for the first UE to use to communicate with the network node.

Some examples of the method, apparatuses, and non-transitory computer-readable medium described herein may further include operations, features, means, or instructions for transmitting the BFR message to the second UE for the second UE to forward to the network node based on identifying the second UE for sidelink communication via the second wireless link before identifying a new candidate synchronization signal block beam associated with the network node.

In some examples of the method, apparatuses, and non-transitory computer-readable medium described herein, transmitting the BFR message may include operations, features, means, or instructions for transmitting the BFR message to the second UE on the second wireless link for the second UE to forward to the network node based on identifying that the first UE failed to receive a BFR response to one or more BFR messages transmitted to the network node.

In some examples of the method, apparatuses, and non-transitory computer-readable medium described herein, the second beam configuration includes SCI, a set of resource pools, a physical sidelink feedback channel (PSFCH) configuration, a set of power control parameters, a set of transmission configuration indication (TCI) states, or any combination thereof, for the second wireless link with the second UE.

In some examples of the method, apparatuses, and non-transitory computer-readable medium described herein, the network node includes a first network node and the method, apparatuses, and non-transitory computer-readable medium may include further operations, features, means, or instructions for transmitting, to the second UE on the second wireless link for the second UE to forward to the network node, a message indicating handover of the first UE to a second network node based on identifying a new cell separate from the network node for the first UE.

In some examples of the method, apparatuses, and non-transitory computer-readable medium described herein, the network node includes a first network node and the method, apparatuses, and non-transitory computer-readable medium may include further operations, features, means, or instructions for performing a random access procedure with a second network node via a RACH and transmitting, to the first network node, a message cancelling communications with the first network node based on performing the random access procedure with the second network node.

Some examples of the method, apparatuses, and non-transitory computer-readable medium described herein may further include operations, features, means, or instructions for receiving, from the network node, control signaling indicating a set of sidelink-capable UEs and selecting to transmit the BFR message to the second UE from the set of sidelink-capable UEs indicated by the control signaling.

In some examples of the method, apparatuses, and non-transitory computer-readable medium described herein, the set of sidelink-capable UEs may be ordered according to a sidelink quality metric.

Some examples of the method, apparatuses, and non-transitory computer-readable medium described herein may further include operations, features, means, or instructions for receiving, from the network node, a control signaling indicating a parameter for communications between the first UE and one or more UEs of the set of sidelink-capable UEs.

In some examples of the method, apparatuses, and non-transitory computer-readable medium described herein, the parameter includes SCI, a resource pool, a PSFCH configuration, a power control parameter, a TCI state, or any combination thereof.

In some examples of the method, apparatuses, and non-transitory computer-readable medium described herein, transmitting the BFR message may include operations, features, means, or instructions for transmitting, to the second UE, SCI including a first bit indicating that the BFR message may be associated with a BFR forwarding request, a second bit indicating whether the first UE may be within coverage of the network node, or both.

In some examples of the method, apparatuses, and non-transitory computer-readable medium described herein, the SCI may include operations, features, means, or instructions for information identifying a first beam identifier as failed, an indicator of a second beam identifier, a cell identifier associated with the network node, uplink data to forward to the network node, or a combination thereof.

In some examples of the method, apparatuses, and non-transitory computer-readable medium described herein, a cell identifier associated with the network node, a set of indicators identifying SSBs associated with the network node that fail to satisfy a power threshold, or any combination thereof.

In some examples of the method, apparatuses, and non-transitory computer-readable medium described herein, transmitting the BFR message may include operations, features, means, or instructions for transmitting the BFR message to the second UE based on identifying that the first UE failed to receive an acknowledgment to a previously-transmitted BFR message transmitted via sidelink to a third UE.

In some examples of the method, apparatuses, and non-transitory computer-readable medium described herein, concurrently transmitting the BFR message via sidelink to a set of multiple sidelink UEs, including the second UE.

Some examples of the method, apparatuses, and non-transitory computer-readable medium described herein may further include operations, features, means, or instructions for selecting to transmit the BFR message to the second UE based on identifying that the second UE and the first UE may be associated with a same cell identifier.

Some examples of the method, apparatuses, and non-transitory computer-readable medium described herein may further include operations, features, means, or instructions for receiving, from each UE of a set of neighboring sidelink UEs, a respective link quality metric for a communication link between the UE and the network node and selecting the second UE from the set of neighboring sidelink UEs based on the second UE having a link quality metric that satisfies a threshold.

A method for wireless communications at a second UE is described. The method may include transmitting a message identifying the second UE and indicating that the second UE has an established communication link between the second UE and a network node, receiving, from a first UE at least in part in response to the transmitted message, a BFR message identifying a beam failure at the first UE for a first beam associated with a first wireless link between the first UE and the network node, and transmitting, to the network node, the BFR message received from the first UE.

An apparatus for wireless communications at a second UE is described. The apparatus may include a processor, memory coupled with the processor, and instructions stored in the memory. The instructions may be executable by the processor to cause the apparatus to transmit a message identifying the second UE and indicating that the second UE has an established communication link between the second UE and a network node, receive, from a first UE at least in part in response to the transmitted message, a BFR message identifying a beam failure at the first UE for a first beam associated with a first wireless link between the first UE and the network node, and transmit, to the network node, the BFR message received from the first UE.

Another apparatus for wireless communications at a second UE is described. The apparatus may include means for transmitting a message identifying the second UE and indicating that the second UE has an established communication link between the second UE and a network node, means for receiving, from a first UE at least in part in response to the transmitted message, a BFR message identifying a beam failure at the first UE for a first beam associated with a first wireless link between the first UE and the network node, and means for transmitting, to the network node, the BFR message received from the first UE.

A non-transitory computer-readable medium storing code for wireless communications at a second UE is described. The code may include instructions executable by a processor to transmit a message identifying the second UE and indicating that the second UE has an established communication link between the second UE and a network node, receive, from a first UE at least in part in response to the transmitted message, a BFR message identifying a beam failure at the first UE for a first beam associated with a first wireless link between the first UE and the network node, and transmit, to the network node, the BFR message received from the first UE.

In some examples of the method, apparatuses, and non-transitory computer-readable medium described herein, transmitting the message may include operations, features, means, or instructions for transmitting a link quality metric associated with the established communication link between the second UE and the network node.

In some examples of the method, apparatuses, and non-transitory computer-readable medium described herein, receiving the BFR message may include operations, features, means, or instructions for receiving SCI including a first bit indicating a BFR forwarding request, a second bit indicating whether the first UE may be within coverage of the network node, or both.

In some examples of the method, apparatuses, and non-transitory computer-readable medium described herein, the SCI may include operations, features, means, or instructions for information identifying a first beam identifier as failed, an indicator of a second beam identifier, a cell identifier associated with the network node, uplink data to forward to the network node, or a combination thereof.

In some examples of the method, apparatuses, and non-transitory computer-readable medium described herein, a cell identifier associated with the network node, a set of SSBs associated with the network node with respective reference signal received powers satisfying a threshold, or a combination thereof.

Some examples of the method, apparatuses, and non-transitory computer-readable medium described herein may further include operations, features, means, or instructions for receiving, from the network node, a RRC signal indicating for the second UE to relay traffic between the network node and the first UE and communicating traffic between the network node and the first UE in accordance with receiving the RRC signal.

Some examples of the method, apparatuses, and non-transitory computer-readable medium described herein may further include operations, features, means, or instructions for receiving, from the first UE, a handover message indicating handover for the first UE to a second network node and transmitting, to the network node, the handover message received from the first UE.

A method for wireless communications at a network node is described. The method may include communicating with a first UE via a first wireless link according to a first beam configuration that identifies a first beam, receiving, from the first UE via a second wireless link between the first UE and a second UE and via a third wireless link between the network node and the second UE, a BFR message identifying a beam failure at the first UE for the first beam associated with the first wireless link, and transmitting, at least in part in response to the received BFR message, a control message indicating a second beam configuration for the first UE to use to communicate with the network node.

An apparatus for wireless communications at a network node is described. The apparatus may include a processor, memory coupled with the processor, and instructions stored in the memory. The instructions may be executable by the processor to cause the apparatus to communicate with a first UE via a first wireless link according to a first beam configuration that identifies a first beam, receive, from the first UE via a second wireless link between the first UE and a second UE and via a third wireless link between the network node and the second UE, a BFR message identifying a beam failure at the first UE for the first beam associated with the first wireless link, and transmit, at least in part in response to the received BFR message, a control message indicating a second beam configuration for the first UE to use to communicate with the network node.

Another apparatus for wireless communications at a network node is described. The apparatus may include means for communicating with a first UE via a first wireless link according to a first beam configuration that identifies a first beam, means for receiving, from the first UE via a second wireless link between the first UE and a second UE and via a third wireless link between the network node and the second UE, a BFR message identifying a beam failure at the first UE for the first beam associated with the first wireless link, and means for transmitting, at least in part in response to the received BFR message, a control message indicating a second beam configuration for the first UE to use to communicate with the network node.

A non-transitory computer-readable medium storing code for wireless communications at a network node is described. The code may include instructions executable by a processor to communicate with a first UE via a first wireless link according to a first beam configuration that identifies a first beam, receive, from the first UE via a second wireless link between the first UE and a second UE and via a third wireless link between the network node and the second UE, a BFR message identifying a beam failure at the first UE for the first beam associated with the first wireless link, and transmit, at least in part in response to the received BFR message, a control message indicating a second beam configuration for the first UE to use to communicate with the network node.

In some examples of the method, apparatuses, and non-transitory computer-readable medium described herein, transmitting the control message may include operations, features, means, or instructions for transmitting, to the first UE via the third wireless link, the control message indicating the second beam configuration for the first UE to use to communicate with the network node, where the second beam configuration includes a second beam.

In some examples of the method, apparatuses, and non-transitory computer-readable medium described herein, transmitting the control message may include operations, features, means, or instructions for transmitting, to the second UE, a RRC signal indicating for the second UE to relay traffic between the network node and the first UE and communicating the traffic, with the first UE via the second UE in accordance with transmitting the RRC signal.

Some examples of the method, apparatuses, and non-transitory computer-readable medium described herein may further include operations, features, means, or instructions for receiving, from the first UE via the second UE, a hand over message indicating handover for the first UE to a second network node and canceling communication traffic with the first UE based on receiving the hand over message.

Some examples of the method, apparatuses, and non-transitory computer-readable medium described herein may further include operations, features, means, or instructions for receiving, from a second network node, a hand over message indicating handover for the first UE to the second network node and canceling communication traffic with the first UE based on receiving the hand over message.

DETAILED DESCRIPTION

Figure 1:
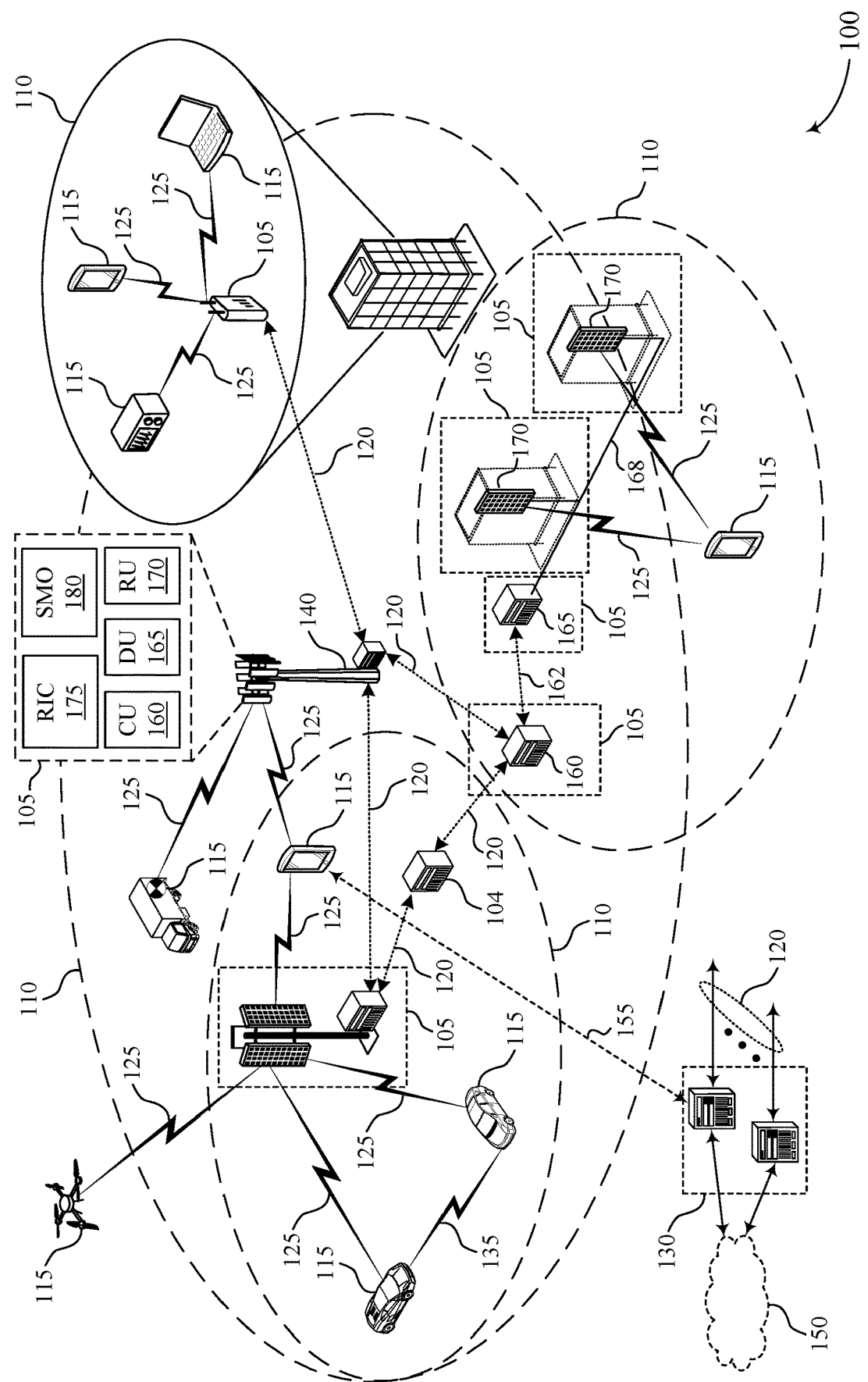
FIG. 1 illustrates an example of a wireless communications system that supports beam failure recovery (BFR) via sidelink in accordance with one or more aspects of the present disclosure.

In some examples of wireless communications, a wireless device (e.g., a user equipment (UE)) may communicate with a network node (which may also be or be referred to as a network entity herein) via a direct (e.g., Uu) link. The UE may also communicate with a second UE via a sidelink. Additionally, the second UE may have a direct (e.g., Uu) link between the second UE and the network node. In some examples, the first UE may experience a beam failure over one or more beams associated with its direct link. As such, the UE may signal to the network node through a random access channel (RACH) procedure (which may also be referred to as a random access procedure herein) over the direct link to establish a second beam for use with the direct link. In some cases, however, use of a RACH procedure to establish a new, second beam may increase latency associated with the direct link, increase power consumption at the first UE, and lead to potentially lost communications due to the performing of the beam failure recovery (BFR) procedure.

As such, the network may reduce the use of a RACH procedure for instances of BFR by utilizing the sidelink with a second UE. For example, the first UE may determine one or more second UEs associated with the network node that may be used as candidate sidelink UEs that may relay a BFR message transmitted by the first UE. In some examples, the network node may preconfigure and signal a list of the candidate sidelink UEs to the first UE. Additionally, or alternatively, the network node may transmit control signaling that configures a set of parameters for the first UE to use to communicate with each of the candidate sidelink UEs. As such, the first UE may signal sidelink control information (SCI) to one or more of the candidate UEs. In some examples, the SCI may include a first bit that indicates that the SCI is for a BFR forwarding request, a second bit that indicates whether the first UE is still within coverage of the network node, or both. In some examples, the first UE may signal the SCI to each candidate UE sequentially in accordance with the list signaled by the network node, such that if the UE does not receive an acknowledgment from a first candidate UE of the list, the first UE may transmit the SCI to a second candidate UE of the list. In some examples, the UE may transmit the SCI to multiple candidates UEs in parallel.

Based on the network node receiving the BFR message, the network node may determine whether the first UE is still within geographic coverage. If the first UE is not within geographic coverage, the network node may set up radio resource control (RRC) sidelink connection with a candidate UE such that the candidate UE may relay traffic from the network node to the first UE via sidelink. Additionally, or alternatively, the first UE may transmit a RACH to a second candidate network node and the candidate network node may signal to the network node to cancel traffic with the first UE. If the first UE is within geographic coverage, the network node may indicate a new beam for use at the first UE.

Aspects of the disclosure are initially described in the context of wireless communications systems. Aspects of the disclosure are further illustrated by process flows. Aspects of the disclosure are further illustrated by and described with reference to apparatus diagrams, system diagrams, and flowcharts that relate to BFR via sidelink.

FIG. 1 illustrates an example of a wireless communications system 100 that supports BFR via sidelink in accordance with one or more aspects of the present disclosure. The wireless communications system 100 may include one or more network nodes 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network nodes 105 may be dispersed throughout a geographic area to form the wireless communications system 100 and may include devices in different forms or having different capabilities. In various examples, a network node 105 may be referred to as a network entity, a network element, a mobility element, a radio access network (RAN) node, or network equipment, among other nomenclature. In some examples, network nodes 105 and UEs 115 may wirelessly communicate via one or more communication links 125 (e.g., a radio frequency (RF) access link). For example, a network node 105 may support a coverage area 110 (e.g., a geographic coverage area) over which the UEs 115 and the network node 105 may establish one or more communication links 125. The coverage area 110 may be an example of a geographic area over which a network node 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network nodes 105, as shown in FIG. 1.

As described herein, anode of the wireless communications system 100, which may be referred to as a network node, or a wireless node, may be a network node 105 (e.g., any network node described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network node 105. As another example, a first node may be configured to communicate with a second node or a third node. In one aspect of this example, the first node may be a UE 115, the second node may be a network node 105, and the third node may be a UE 115. In another aspect of this example, the first node may be a UE 115, the second node may be a network node 105, and the third node may be a network node 105. In yet other aspects of this example, the first, second, and third nodes may be different relative to these examples. Similarly, reference to a UE 115, network node 105, apparatus, device, computing system, or the like may include disclosure of the UE 115, network node 105, apparatus, device, computing system, or the like being a node. For example, disclosure that a UE 115 is configured to receive information from a network node 105 also discloses that a first node is configured to receive information from a second node.

In some examples, network nodes 105 may communicate with the core network 130, or with one another, or both. For example, network nodes 105 may communicate with the core network 130 via one or more backhaul communication links 120 (e.g., in accordance with an S1, N2, N3, or other interface protocol). In some examples, network nodes 105 may communicate with one another via a backhaul communication link 120 (e.g., in accordance with an X2, Xn, or other interface protocol) either directly (e.g., directly between network nodes 105) or indirectly (e.g., via a core network 130). In some examples, network nodes 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network nodes 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network node 105 (e.g., a base station 140) may be implemented in an aggregated (e.g., monolithic, standalone) base station architecture, which may be configured to utilize a protocol stack that is physically or logically integrated within a single network node 105 (e.g., a single RAN node, such as a base station 140).

In some examples, a network node 105 may be implemented in a disaggregated architecture (e.g., a disaggregated base station architecture, a disaggregated RAN architecture), which may be configured to utilize a protocol stack that is physically or logically distributed among two or more network nodes 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network node 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network nodes 105 in a disaggregated RAN architecture may be co-located, or one or more components of the network nodes 105 may be located in distributed locations (e.g., separate physical locations). In some examples, one or more network nodes 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., RRC, service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network nodes 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network nodes 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network node 105 (e.g., a donor base station 140). The one or more donor network nodes 105 (e.g., IAB donors) may be in communication with one or more additional network nodes 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support BFR via sidelink as described herein. For example, some operations described as being performed by a UE 115 or a network node 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network nodes 105 and the network equipment including macro eNBs or gNBs, small cell eNBs or gNBs, or relay base stations, among other examples, as shown in FIG. 1.

The UEs 115 and the network nodes 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network node 105 and other devices may refer to communication between the devices and any portion (e.g., entity, sub-entity) of a network node 105. For example, the terms "transmitting," "receiving," or "communicating," when referring to a network node 105, may refer to any portion of a network node 105 (e.g., a base station 140, a CU 160, a DU 165, a RU 170) of a RAN communicating with another device (e.g., directly or via one or more other network nodes 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network nodes 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network node 105 may provide communication coverage via one or more cells, for example a macro cell, a small cell, a hot spot, or other types of cells, or any combination thereof. The term "cell" may refer to a logical communication entity used for communication with a network node 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network node 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network node 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network node 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network node 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network node 105. In some other examples, the overlapping coverage areas 110 associated with different technologies may be supported by different network nodes 105. The wireless communications system 100 may include, for example, a heterogeneous network in which different types of the network nodes 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network node 105 (e.g., a base station 140, an RU 170), which may support aspects of such D2D communications being configured by (e.g., scheduled by) the network node 105. In some examples, one or more UEs 115 of such a group may be outside the coverage area 110 of a network node 105 or may be otherwise unable to or not configured to receive transmissions from a network node 105. In some examples, groups of the UEs 115 communicating via D2D communications may support a one-to-many (1:M) system in which each UE 115 transmits to each of the other UEs 115 in the group. In some examples, a network node 105 may facilitate the scheduling of resources for D2D communications. In some other examples, D2D communications may be carried out between the UEs 115 without an involvement of a network node 105.

The core network 130 may provide user authentication, access authorization, tracking, Internet Protocol (IP) connectivity, and other access, routing, or mobility functions.

The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network nodes 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network nodes 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network node 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network node 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network node 105 may be located at diverse geographic locations. A network node 105 may include an antenna array with a set of rows and columns of antenna ports that the network node 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network node 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network node 105 or a UE 115 may use beam sweeping techniques as part of beamforming operations. For example, a network node 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network node 105 multiple times along different directions. For example, the network node 105 may transmit a signal according to different beamforming weight sets associated with different directions of transmission. Transmissions along different beam directions may be used to identify (e.g., by a transmitting device, such as a network node 105, or by a receiving device, such as a UE 115) a beam direction for later transmission or reception by the network node 105.

Some signals, such as data signals associated with a particular receiving device, may be transmitted by transmitting device (e.g., a transmitting network node 105, a transmitting UE 115) along a single beam direction (e.g., a direction associated with the receiving device, such as a receiving network node 105 or a receiving UE 115). In some examples, the beam direction associated with transmissions along a single beam direction may be determined based on a signal that was transmitted along one or more beam directions. For example, a UE 115 may receive one or more of the signals transmitted by the network node 105 along different directions and may report to the network node 105 an indication of the signal that the UE 115 received with a highest signal quality or an otherwise acceptable signal quality.

In some examples, transmissions by a device (e.g., by a network node 105 or a UE 115) may be performed using multiple beam directions, and the device may use a combination of digital precoding or beamforming to generate a combined beam for transmission (e.g., from a network node 105 to a UE 115). The UE 115 may report feedback that indicates precoding weights for one or more beam directions, and the feedback may correspond to a configured set of beams across a system bandwidth or one or more sub-bands. The network node 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network node 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network node 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network node 105 or a core network 130 supporting radio bearers for user plane data. A PHY layer may map transport channels to physical channels.

In some examples of wireless communications system 100, a UE 115 may communicate with a network node 105 via a direct link. The UE 115 may also communicate with a second UE 115 via a sidelink. Additionally, the second UE 115 may have a direct link between the second UE 115 and the network node 105. In some examples, the first UE 115 may experience a beam failure over one or more beams associated with its direct link. As such, the network may reduce the use of a RACH procedure for instances of BFR by utilizing the sidelink with a second UE 115. For example, the first UE 115 may determine one or more second UEs 115 associated with the network node 105 that may be used as candidate sidelink UEs 115 that may relay a BFR message transmitted by the first UE 115.

In some examples, the network node 105 may preconfigure and signal a list of the candidate sidelink UEs 115 to the first UE 115. Additionally, or alternatively, the network node 105 may transmit control signaling that configures a set of parameters for the first UE 115 to use to communicate with each of the candidate sidelink UEs 115. As such, the first UE 115 may signal SCI to one or more of the candidate UEs 115. In some examples, the SCI may include a first bit that indicates that the SCI is for a BFR forwarding request, a second bit that indicates whether the first UE 115 is still within coverage of the network node 105, or both. In some examples, the first UE 115 may signal the SCI to each candidate UE 115 sequentially in accordance with the list signaled by the network node 105, such that if the UE 115 does not receive an acknowledgment from a first candidate UE 115 of the list, the first UE 115 may transmit the SCI to a second candidate UE 115 of the list. In some examples, the UE 115 may transmit the SCI to multiple candidates UEs 115 in parallel.

In some cases, the first UE 115 may determine which candidate UE 115 to help forward the BFR message based on each of the candidate UEs 115 transmitting information to the first UE 115. For example, each candidate UE 115 may transmit (e.g., via unicast, broadcast, or groupcast) the ID of the current serving cell in use. Additionally, or alternatively, each candidate UE 115 may transmit an indication of an updated direct link quality with the network node 105 such that the UE 115 may select a candidate UE 115 with the highest link quality.

Based on the network node 105 receiving the BFR message, the network node 105 may determine whether the first UE 115 is still within geographic coverage. If the first UE 115 is not within geographic coverage, the network node 105 may set up RRC sidelink connection with a candidate UE 115 such that the candidate UE 115 may relay traffic from the network node 105 to the first UE 115 via sidelink. Additionally, or alternatively, the first UE 115 may transmit a RACH to a second candidate network node 105 and the candidate network node 105 may signal to the network node 105 to cancel traffic with the first UE 115. If the first UE 115 is within geographic coverage, the network node 105 may indicate a new beam for use at the first UE 115.

Figure 2:
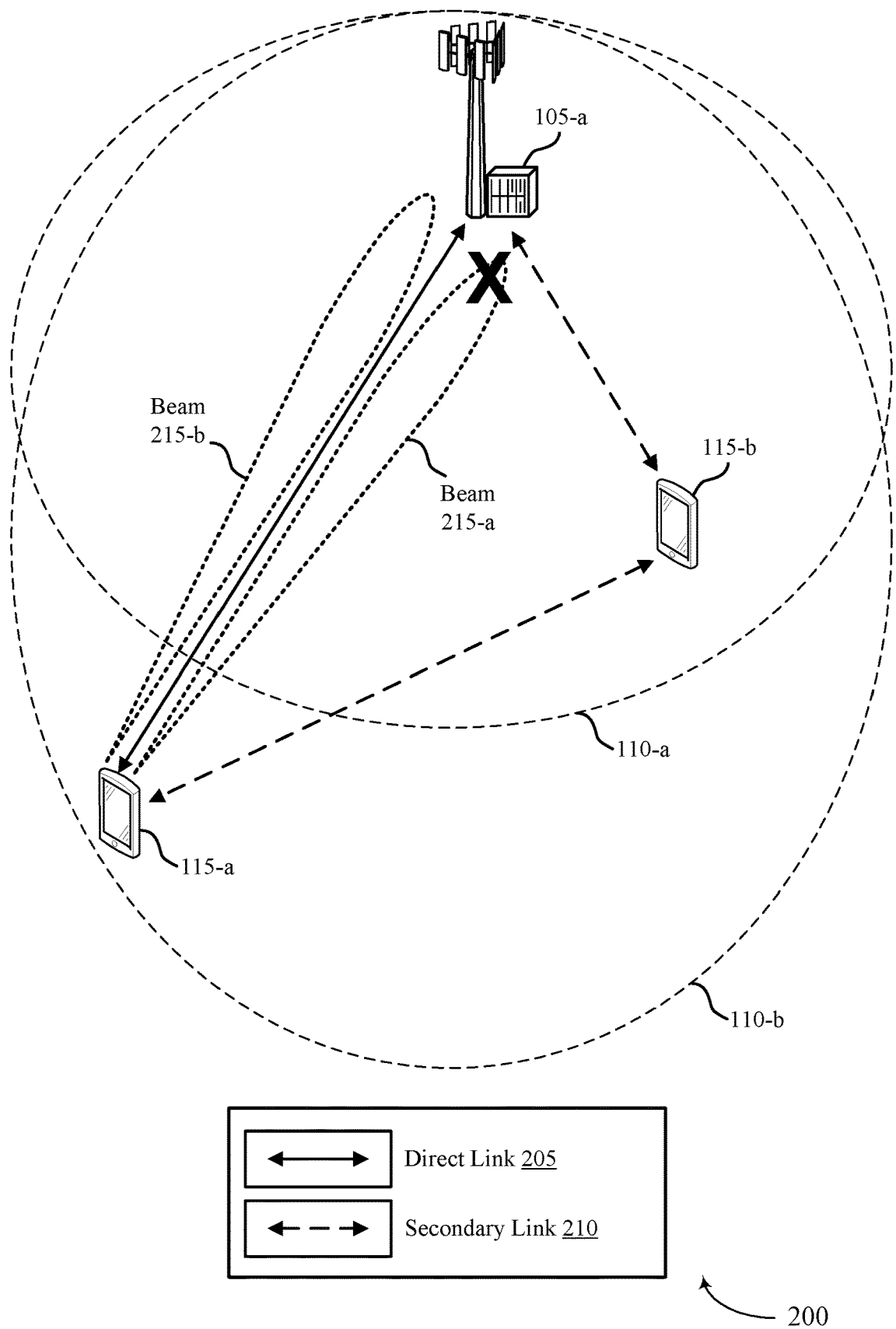
FIG. 2 illustrates an example of a wireless communications system that supports BFR via sidelink in accordance with one or more aspects of the present disclosure.

FIG. 2 illustrates an example of a wireless communications system 200 that supports BFR via sidelink in accordance with one or more aspects of the present disclosure. In some examples, wireless communications system 200 may implement one or more aspects of wireless communications system 100. For instance, a UE 115-a, a UE 115-b, and a network node 105-a may be respective examples of UEs 115 and a network node 105, with reference to FIG. 1. Additionally, or alternatively, geographic coverage area 110-a and geographic coverage area 110-b may be associated with the network node 105-a and be examples of geographic coverage areas 110 with reference to FIG. 1. While examples are discussed herein, any number of devices and device types may be used to implement techniques described in the present disclosure.

Wireless communications system 200 may support multi-path communications between the UE 115-a and the network node 105-a via a direct link 205 (e.g., Uu link) and a secondary link 210. In some examples, the UE 115-a may utilize the secondary link 210 to aid in the transmission of beam failure information associated with one or more beams 215 of the direct link 205. In some examples, the secondary link 210 may include a direct link (e.g., Uu link) between the network node 105-a and the UE 115-b and a sidelink between the UE 115-b and the UE 115-a. In other examples, one or more sidelinks with additional UEs may be used as part of the secondary link, such that the secondary link includes more than two wireless links (e.g., hops) between UE 115-a and network node 105-a.

In some examples, the UE 115-a may communicate with network node 105-a via the direct link 205 using one or more beams 215. In some cases, the UE 115-a may experience beam failure if the radio conditions of the wireless communications system 200 change (e.g., when an end-user steps around a corner or a vehicle causes an obstruction, such that existing beams 215 become unreliable before the UE 115-a has been able to switch to a second beam 215). As such, a PHY layer associated with the UE 115-a may perform radio link monitoring (RLM) via RLM reference signals (RLM-RS). In some examples, measurement results may be passed to the MAC layer, the RRC layer, or both. In some examples, the RRC layer may be responsible for radio link failure (RLF) detection and the MAC layer may be responsible for detecting beam failure. For instance, the PHY layer may use quality thresholds to trigger failure indications to the MAC layer (e.g., Qout LR corresponds to a quality at which each monitored RLM-RS falls below a configured threshold which results in a beamFailureInstance). The MAC layer may use these indications in combination with a beam failure instance threshold (e.g., beamFailureInstanceMaxCount) that may be configured for a duration of time (e.g., beamFailureDetectionTimer) to detect a beam failure. For instance, if beamFailureInstanceMaxCount is exceeded during the duration of beamFailureDetectionTimer, the MAC layer may identify a beam failure. For example, with reference to FIG. 2, the MAC layer may identify a beam failure for beam 215-a.

Once a beam failure is detected for beam 215-a, the UE 115 may attempt to recover the beam 215-a by initiating in a RACH procedure (e.g., a contention free random access (CFRA) associated with BFR). In some examples, before transmitting a RACH preamble to initiate the RACH procedure, the UE 115 may identify a second beam 215 (e.g., beam 215-b) via measuring reference signal received power (RSRP) for each of a set of candidate beams 215. As such, the UE 115-a may use the beam 215-b for the RACH procedure in accordance with the BFR.

In some examples, a RACH procedure may have a longer latency compared to other BFR transmission techniques. For instance a RACH may have an associated occasion period (e.g., 10 ms, 20 ms, or 40 ms) the UE 115 may wait before transmitting a first RACH message (e.g., Msg1 of the RACH procedure). The RACH procedure may incur latency due to the UE 115 searching and measuring synchronization signal blocks (SSBs) to find the candidate beam 215-b to use for sending the RACH preamble. The RACH procedure may incur latency based on the UE 115 waiting for a preconfigured RACH occasion associated with the candidate beam 215-b. The RACH procedure may incur latency based one the UE 115 waiting for a random access response (RAR) message for a response from the network node 105-a. Additionally, or alternatively, a BFR RACH procedure may not support the transmission of latency urgent uplink traffic to the network node 105-a. Additionally, or alternatively, if the UE 115-a moves out of coverage of the network node 105-a (e.g., outside of geographic coverage area 110-a), the UE 115 may be unable to identify the candidate beam 215-b to transmit the RACH preamble.

As such, during an instance of beam failure, the UE 115-a may choose a neighbor UE 115 (e.g., the UE 115-b) to act as a relay to forward BFR information to the network node 105-a. In some examples, a relay via a sidelink to the network node 105-a (e.g., the secondary link 210) may have a shorter latency relative to the RACH procedure (e.g., on the order of 10 slots). As such, before the UE 115 identifies the candidate beam 215-b and an associated RACH occasion to send the first RACH message, if the UE 115-a can find identify the UE 115-b, the UE 115-a may use sidelink assisted BFR and cancel the BFR RACH. In some examples, the UE 115-a may perform such techniques in cases where the wireless communications are covered by geographic coverage area 110-b and in cases where the UE 115-a may benefit from latency reduction (e.g., for uplink URLLC traffic).

In some examples, the network node 105-a may not support wireless communications past the geographic coverage area 110-a (e.g., the UE 115-a may be outside of coverage). In such examples, performing the BFR via the secondary link 210 may result in coverage extension. For instance, based on the UE 115-b being within the geographic coverage area 110-a, the UE 115-a may communicate with the network node 105-a (e.g., using the UE 115-b as a relay) when the UE 115-a may be outside of geographic coverage area 110-a. In some examples, the UE 115-a may determine to extend network coverage via the secondary link 210 if the UE 115-a transmits a BFR RACH a configured number of times (e.g., N times) without a response, or if the UE 115-a is unable to identify a qualified candidate beam 215. Based on performing the sidelink assisted BFR via the secondary link 210, the UE 115-a may conduct future communications with the network node 105-a via the secondary link 210. Additionally, or alternatively, the UE 115-a perform a handover procedure to a second candidate cell (e.g., associated with the network node 105-a or a second network node 105) if the UE 115-a identifies a qualified SSB associated with the second candidate cell.

In some cases, the network node 105-a may preconfigure and signal a list of candidate neighbor UEs 115 (e.g., including the UE 115-b) to the UE 115-a. The network node 105-a may signal the list in examples where the network coverage extends to geographic coverage area 110-a and in cases where the network coverage extends to geographic coverage area 110-b. In some examples, the UE 115-a may signal the candidate neighbor UEs 115 to request assistance with the BFR procedure in accordance with a configured order (e.g., in descending order in terms of sidelink quality). In some examples, the network node 105-a may periodically transmit an updated list of candidate neighbor UEs 115 (e.g., if a candidate neighbor UE 115 moves out of coverage, the network node 105-a may remove the UE 115 from the list). In some examples, the periodicity of the updated list may be configured (e.g., in a low duty cycle). For instance, a given neighbor candidate UE 115 (e.g., the UE 115-b) may be within coverage of the UE 115-a, and may detect a discovery signal from the UE 115-a. As such, the UE 115-b may transmit to the network node 105-a, an event triggered report if the RSRP for SCI transmitted between the UE 115-b and the UE 115-a satisfies one or more thresholds. For example, if the SCI RSRP is below a first quality threshold, the UE 115-b may indicate a low sidelink quality to the network node 105-a and if the SCI RSRP is above a second quality, the UE 115-b may indicate a satisfactory sidelink quality. As such, the network node may update the list of neighbor candidate UEs 115 in accordance with the sidelink quality received from each neighbor candidate UE 115.

In some cases, the UE 115-a may receive from the network node 105-a RRC signaling that may preconfigure one or more set up parameters between the UE 115-a and each candidate neighbor UE 115. For example, the configuration may include SCI, resource pools, a physical sidelink feedback channel (PSFCH) configuration, a power control parameter, one or more transmission configuration indication (TCI) states, or any combination thereof. In some examples, the UE 115-a may receive the RRC configuration for latency reduction if the UE 115-a is within network coverage of the network node 105-a and has associated URLLC traffic.

In some cases, the UE 115-a may signal SCI to the UE 115-b that may include a first bit that indicates whether the SCI is for a BFR forwarding request or if the SCI is for a sidelink scheduling purpose. Additionally, or alternatively, the SCI may include a second bit to indicate whether the UE 115-a is within coverage of the network node 105-a or out of coverage of the network node 105-a. If the second bit indicates that the UE 115-a is out of coverage, the UE 115-b may identify to serve as a relay for future communications between the network node 105-a and the UE 115-a. If the second bit indicates that the UE 115-a within coverage, the UE 115-b may identify that after secondary link 210 assisted BFR, future communications between the UE 115-a and the network node 105-a may be performed via the direct link 205 using the beam 215-b rather than using the UE 115-b as a relay.

In some examples, the contents included in the SCI may be based on the indication of the first bit and the second bit. For example, if the SCI is for a BFR forwarding request within coverage, in the payload of the SCI the UE 115-a may include information identifying that the beam 215-a has failed, an indicator of the second beam 215-b, a cell identifier associated with the network node 105-a, a URLLC message, or a combination thereof. Additionally, or alternatively, if the SCI is for a BFR forwarding request out of coverage, in the payload of the SCI the UE 115-a may include a cell identifier associated with the network node 105-a, a set of indicators identifying SSBs associated with the network node 105-a that fail to satisfy a configured power threshold (e.g., SSB RSRP is less than an RSRP threshold), or any combination thereof. In some cases, the UE 115-a may use a MAC control element (MAC-CE) to transmit to the UE 115-b the BFR and the related contents described herein rather than the SCI.

In some examples, the UE 115 may signal the SCI to each neighbor candidate UE 115 sequentially. For example, if the UE 115-a does not receive an acknowledgment (ACK) message from a first neighbor candidate UE 115 (e.g., during a configured timing threshold), the UE 115 may signal the SCI for BFR to a second neighbor candidate UE 115. Additionally, or alternatively, the UE 115-a may concurrently signal the SCI to multiple neighbor candidate UEs 115 in parallel. In some examples, transmitting the SCI concurrently to multiple neighbor candidate UEs 115 may result in a higher transmission reliability.

For cases where the UE 115-a is out of coverage of the network node 105-a, once the network node 105-a receives the BFR request via the secondary link 210, the network node 105-a may set up an RRC sidelink connection with the UE 115-b via the secondary link 210. As such, the network node 105-a and the UE 115-a may communicate traffic via sidelink while the UE 115-a is out of coverage. In some examples, the RRC configuration from the network node 105-a to the UE 115-b may include SCI, resource pools, a PSFCH configuration, a power control parameter, one or more TCI states, or any combination thereof.

Additionally, or alternatively, if the UE 115-a is out of coverage of the network node 105-a and finds a second cell to connect to, it may send a handover message via the UE 115-b to the current cell of the network node 105-a. Additionally, or alternatively, if the UE 115-a is preconfigured with candidate neighbor cells, the UE 115-a may send a RACH directly to the second cell. As such, the second cell may indicate to the current cell to cancel traffic with the UE 115-a and indicate to the UE 115-a to switch to the second cell.

In some examples, each neighbor candidate UE 115 may broadcast or unicast a respective serving cell, PCID, or group PCID (e.g., associated with a same DU 165 of the network node 105-a, a same CU 160 of the network node 105-a, or different CUs 160 of the network node 105-a that can coordinate with each other). Additionally, or alternatively, the neighbor candidate UEs 115 may broadcast or unicast if the serving cell ID, PCID, or group PCID changes. As such, the UE 115-a may select a candidate UE 115 (e.g., the UE 115-b) that shares a same serving cell ID or PCID with the UE 115-a.

In some examples, each neighbor candidate UE 115 may dynamically, periodically, or a-periodically transmit to the UE 115-a and update its respective direct link quality with the network node 105-a. As such, the UE 115-a may select a candidate UE 115 with a link quality above a configured threshold to forward the BFR request info to the network node 105-a.

Figure 3:
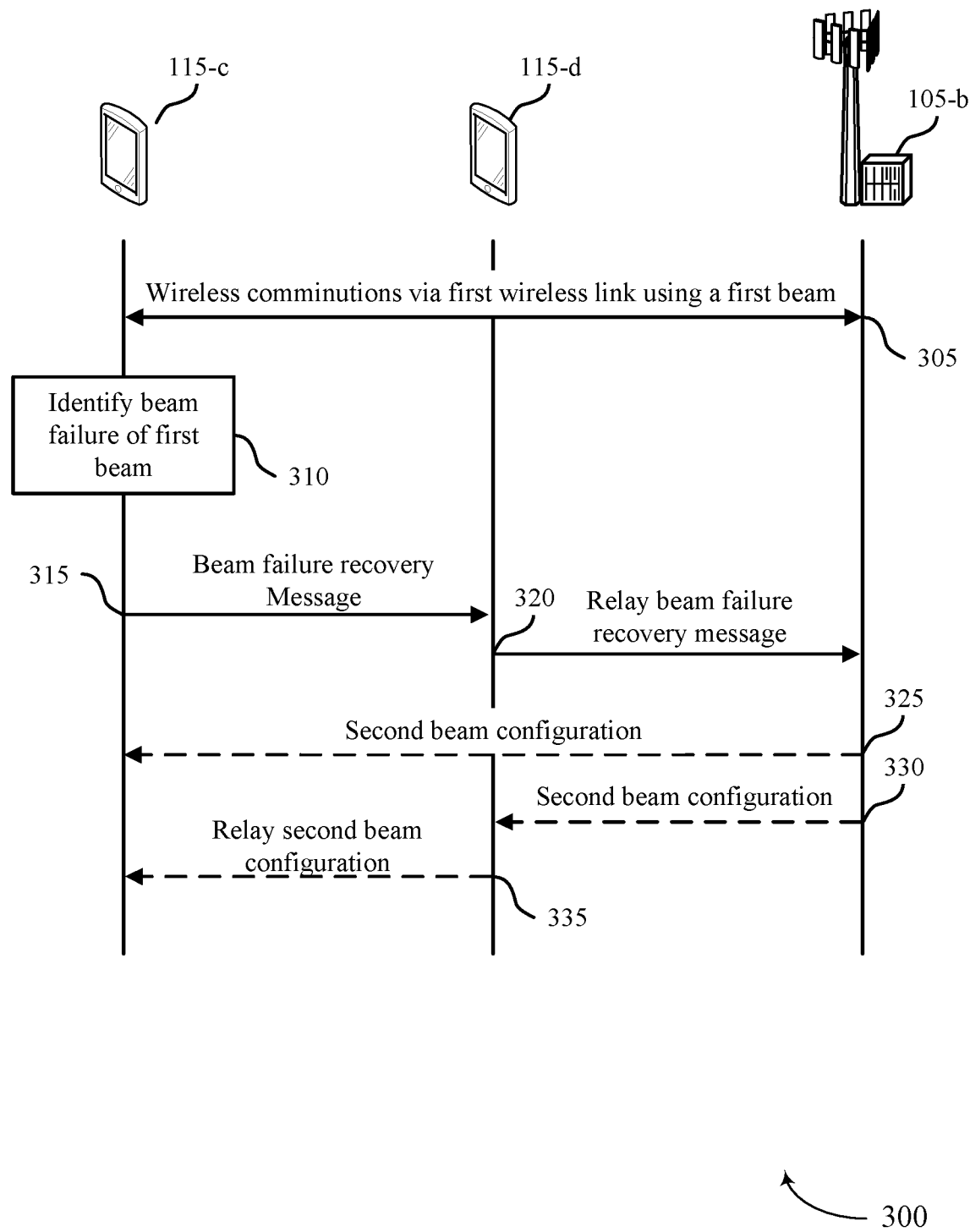
FIG. 3 illustrates an example of a process flow that supports BFR via sidelink in accordance with one or more aspects of the present disclosure.

FIG. 3 illustrates an example of a process flow 300 that supports BFR via sidelink in accordance with one or more aspects of the present disclosure. In some examples, process flow 300 may implement aspects of wireless communications system 100, wireless communications system 200, or a combination thereof. Process flow 300 includes a UE 115-c, a UE 115-d, and a network node 105-b, which may be respective examples of UEs 115 and a network node 105, as described with reference to FIGS. 1 and 2. Alternative examples of the following may be implemented, where some steps may be performed in a different order than described or are not performed at all. In some cases, steps may include additional features not mentioned below, or further steps may be added. In addition, while process flow 300 shows processes between two UEs 115 and a single network node 105, it should be understood that these processes may occur between any number of wireless devices, network devices, and/or network device types.

At 305, the UE 115-c may communicate with the network node 105-b via a first wireless link using a first beam according to a first beam configuration.

At 310, the UE 115-c may identify a beam failure for the first beam associated with the first wireless link.

At 315, the UE 115-c may transmit via a second wireless link with the UE 115-d a BFR message in response to identifying a beam failure for the first beam.

At 320, the UE 115-d may relay via the second wireless link, the BFR message to the network node 105-b.

The UE 115-c may receive, at least in part in response to the BFR message, a control message indicating a second beam configuration for the UE 115-c to use to communicate with the network node 105-b. In some examples, at 325, the UE 115-c may receive the control message directly from the network node 105-b. In some examples, at 330, the UE 115-d may receive the control message from the network node 105-b, and at 335, the UE 115-d may relay the control message to the UE 115-c.

Figure 4:
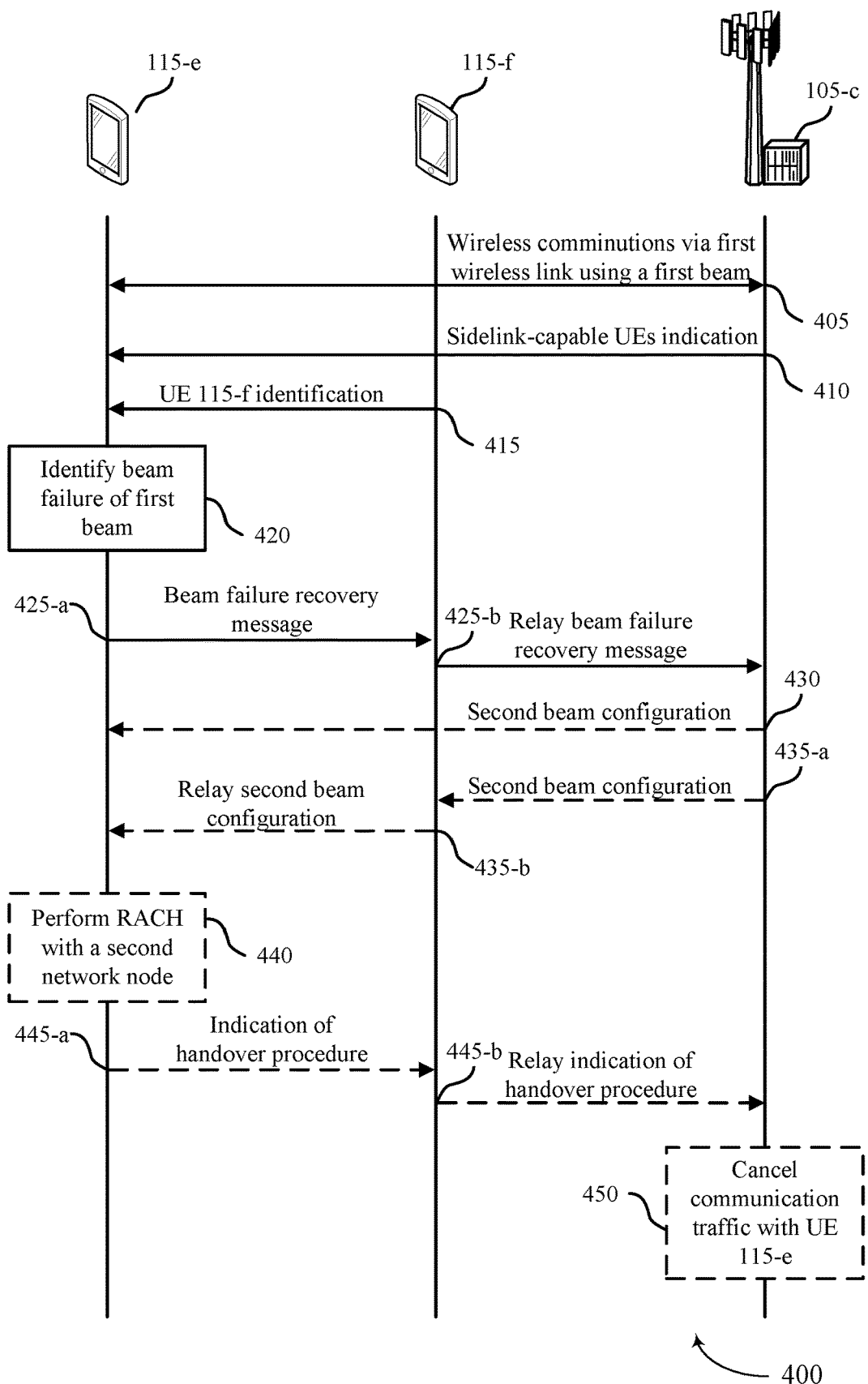
FIG. 4 illustrates an example of a process flow that supports BFR via sidelink in accordance with one or more aspects of the present disclosure.

FIG. 4 illustrates an example of a process flow 400 that supports BFR via sidelink in accordance with one or more aspects of the present disclosure. In some examples, process flow 400 may implement aspects of wireless communications system 100, wireless communications system 200, or a combination thereof. Process flow 400 includes a UE 115-e, a UE 115-f, and a network node 105-c, which may be respective examples of UEs 115 and a network node 105, as described with reference to FIGS. 1 and 2. Alternative examples of the following may be implemented, where some steps may be performed in a different order than described or are not performed at all. In some cases, steps may include additional features not mentioned below, or further steps may be added. In addition, while process flow 400 shows processes between two UEs 115 and a single network node 105, it should be understood that these processes may occur between any number of wireless devices, network devices, and/or network device types.

At 405, the UE 115-e may communicate with the network node 105-c via a first wireless link using a first beam according to a first beam configuration.

At 410, the UE 115-e may receive from the network node 105-c, control signaling indicating a set of sidelink-capable UEs 115 (e.g., including the UE 115-f). In some examples, the set of sidelink-capable UEs 115 may be ordered according to a sidelink quality metric. In some examples, the control signaling may indicate a parameter for communications between the UE 115-e and one or more UEs 115 of the set of sidelink-capable UEs 115. For example, the parameter may include SCI, a resource pool, a PSFCH configuration, a power control parameter, a TCI state, or any combination thereof.

At 415, the UE 115-f may transmit to the UE 115-e a message identifying the UE 115-f and indicating that the UE 115-f has an established communication link between the UE 115-f and the network node 105-c. In some examples, the UE 115-f may also transmit a link quality metric associated with the established communication link between the UE 115-f and the network node 105-c.

Additionally, or alternatively, the UE 115-e may receive from each UE 115 of a set of neighboring UEs 115, a respective link quality metric for a communication link between the respective UE 115 and the network node 105-c.

At 420, the UE 115-e may identify a beam failure for the first beam associated with the first wireless link.

At 425, the UE 115-e may transmit to the network node 105-c via a second wireless link with the UE 115-f, a BFR message in response to identifying a beam failure for the first beam associated with the first wireless link. For example, at 425-a, the UE 115-e may transmit the BFR message to the UE 115-f based on identifying the UE 115-f for sidelink communication via the second wireless link before identifying an SSB associated with the network node 105-c. In some examples, the UE may transmit the BFR message based on identifying that the UE 115-e failed to receive a response to one or more BFR messages transmitted to the network node 105-c.

In some examples, at 425-a, the UE 115-e may transmit to the UE 115-f, SCI including a first bit indicating that the BFR message may be associated with a BFR forwarding request, a second bit indicating whether the UE 115-e may be within coverage of the network node 105-c, or both. If the second bit indicates that the UE 115-e is inside the coverage of the network node 105-c, the SCI may include information identifying the first beam has failed, an indicator of a second beam, a cell identifier associated with the network node 105-c, uplink data to forward to the network node 105-c, or a combination thereof. If the second bit indicates that the UE 115-e is outside the coverage of the network node 105-c, the SCI may include a cell identifier associated with the network node 105-c, a set of indicators identifying SSBs associated with the network node 105-c that fail to satisfy a power threshold, or any combination thereof.

In some examples, the UE 115-e may transmit the BFR message to the UE 115-f based on identifying that the UE 115-e failed to receive an ACK message to a previously-transmitted BFR message transmitted via sidelink to another UE 115. Additionally, or alternatively, the UE 115-e may concurrently transmit the BFR message via sidelink to a plurality of UEs 115, including the UE 115-f.

In some examples, the UE 115-e may select to transmit the BFR message to the UE 115-f based on identifying that the UE 115-f and the UE 115-e are associated with a same cell identifier. Additionally, or alternatively, the UE 115-e may select to transmit the BFR message to the UE 115-f based on the UE 115-f having a link quality metric that satisfies a threshold.

At 425-b, the UE 115-f may relay the BFR message to the network node 105-c.

The UE 115-e may receive, at least in response to the BFR message, a control message indicating a second beam configuration for the UE 115-e to use to communicate with the network node 105-c.

In some examples, at 430, the UE 115-e may receive the control message directly from the network node 105-c. For example, the network node 105-c may transmit to the UE 115-e via a third wireless link, the control message indicating the second beam configuration for the UE 115-e to use to communicate with the network node 105-c, where the second beam configuration includes a second beam.

Additionally, or alternatively, at 435-a, the UE 115-f may receive from the network node 105-c, an RRC signal indicating for the UE 115-f to relay traffic between the network node 105-c and the UE 115-e. At 435-b, the UE may relay the second beam configuration to the UE 115-e, and as such may communicate traffic between the network node 105-c and the UE 115-e in accordance with receiving the RRC signal. In some examples, the second beam configuration may include SCI, a set of resource pools, a PSFCH configuration, a set of power control parameters, a set of TCI states, or any combination thereof, for the second wireless link with the UE 115-f.

Additionally, or alternatively, at 440, the UE 115-e may perform a random access procedure with a second network node 105-c 105 via a RACH.

At 445-a, the UE 115-a may transmit to the network node 105-c via the link, a message indicating handover of the UE 115-e to the second network node 105-c based on identifying a second cell separate from the network node 105-c for the UE 115-e. In some examples, the message indicating handover may include a message cancelling communications with the first network node 105-c based on performing the random access procedure with the second network node 105-c.

At 445-b, the network node 105-c may receive, from the UE 115-e via the UE 115-f, the hand over message indicating handover for the UE 115-e to a second network node 105-c. Additionally, or alternatively, at 445, the network node 105-c may receive from the second network node 105-c the hand over message indicating handover for the UE 115-e to the second network node 105-c.

At 450, the network node 105-c may cancel communication traffic with the UE 115-e based on receiving the hand over message.

Figure 5:
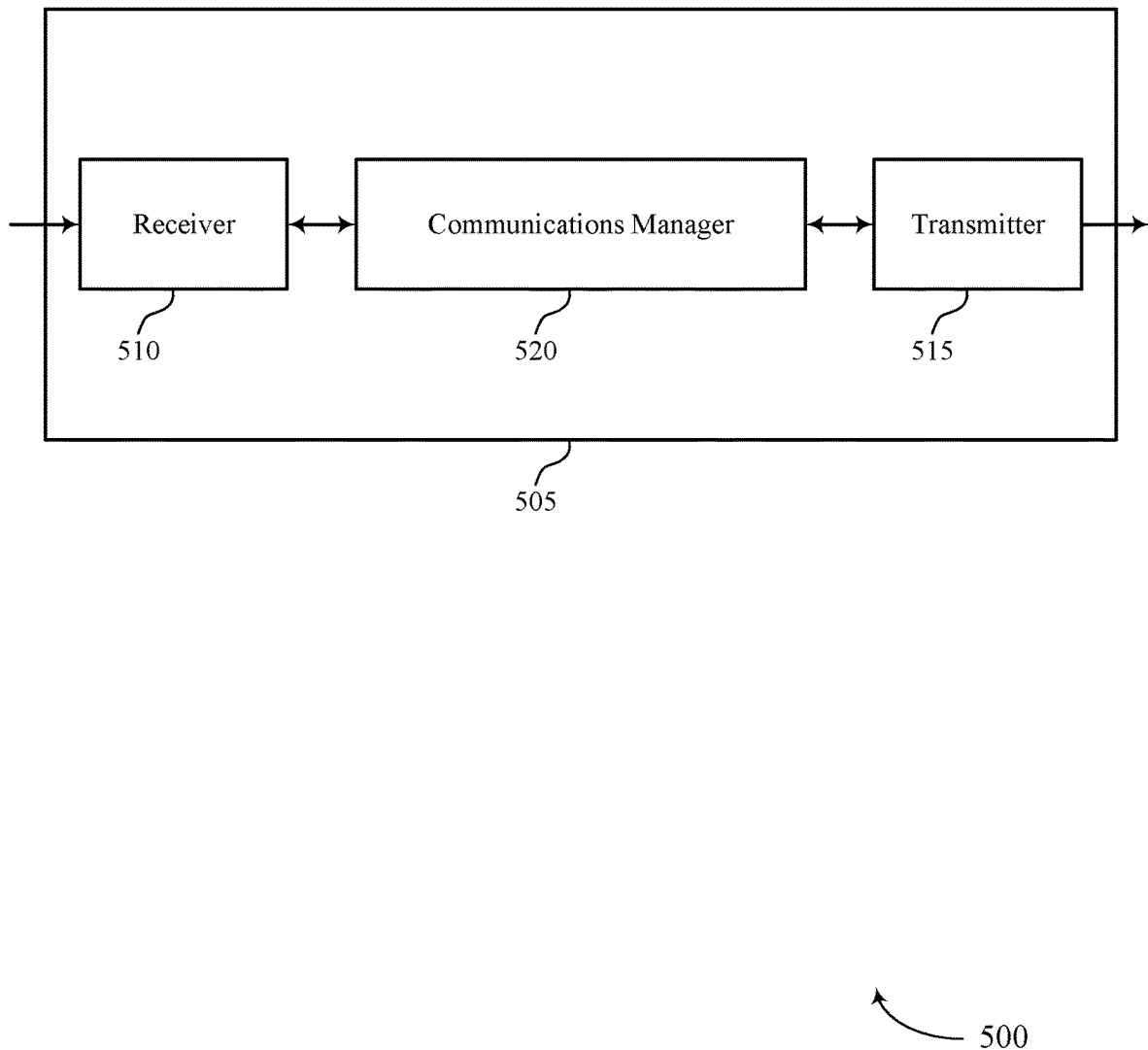
FIGS. 5 and 6 show block diagrams of devices that support BFR via sidelink in accordance with one or more aspects of the present disclosure.

FIG. 5 shows a block diagram 500 of a device 505 that supports BFR via sidelink in accordance with one or more aspects of the present disclosure. The device 505 may be an example of aspects of a UE 115 as described herein. The device 505 may include a receiver 510, a transmitter 515, and a communications manager 520. The device 505 may also include one or more processors, memory coupled with the one or more processors, and instructions stored in the memory that are executable by the one or more processors to enable the one or more processors to perform the BFR features discussed herein. Each of these components may be in communication with one another (e.g., via one or more buses).

The receiver 510 may provide a means for receiving information such as packets, user data, control information, or any combination thereof associated with various information channels (e.g., control channels, data channels, information channels related to BFR via sidelink). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to BFR via sidelink). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of BFR via sidelink as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a first UE in accordance with examples as disclosed herein. For example, the communications manager 520 may be configured as or otherwise support a means for communicating with a network node via a first wireless link using a first beam according to a first beam configuration. The communications manager 520 may be configured as or otherwise support a means for transmitting to the network node via a second wireless link with a second UE, a BFR message in response to identifying a beam failure for the first beam associated with the first wireless link. The communications manager 520 may be configured as or otherwise support a means for receiving, at least in part in response to the BFR message, a control message indicating a second beam configuration for the first UE to use to communicate with the network node.

Additionally, or alternatively, the communications manager 520 may support wireless communications at a second UE in accordance with examples as disclosed herein. For example, the communications manager 520 may be configured as or otherwise support a means for transmitting a message identifying the second UE and indicating that the second UE has an established communication link between the second UE and a network node. The communications manager 520 may be configured as or otherwise support a means for receiving, from a first UE at least in part in response to the transmitted message, a BFR message identifying a beam failure at the first UE for a first beam associated with a first wireless link between the first UE and the network node. The communications manager 520 may be configured as or otherwise support a means for transmitting, to the network node, the BFR message received from the first UE.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for sidelink based BFR messaging which may result in reduced processing, reduced power consumption, and more efficient utilization of communication resources.

Figure 6:
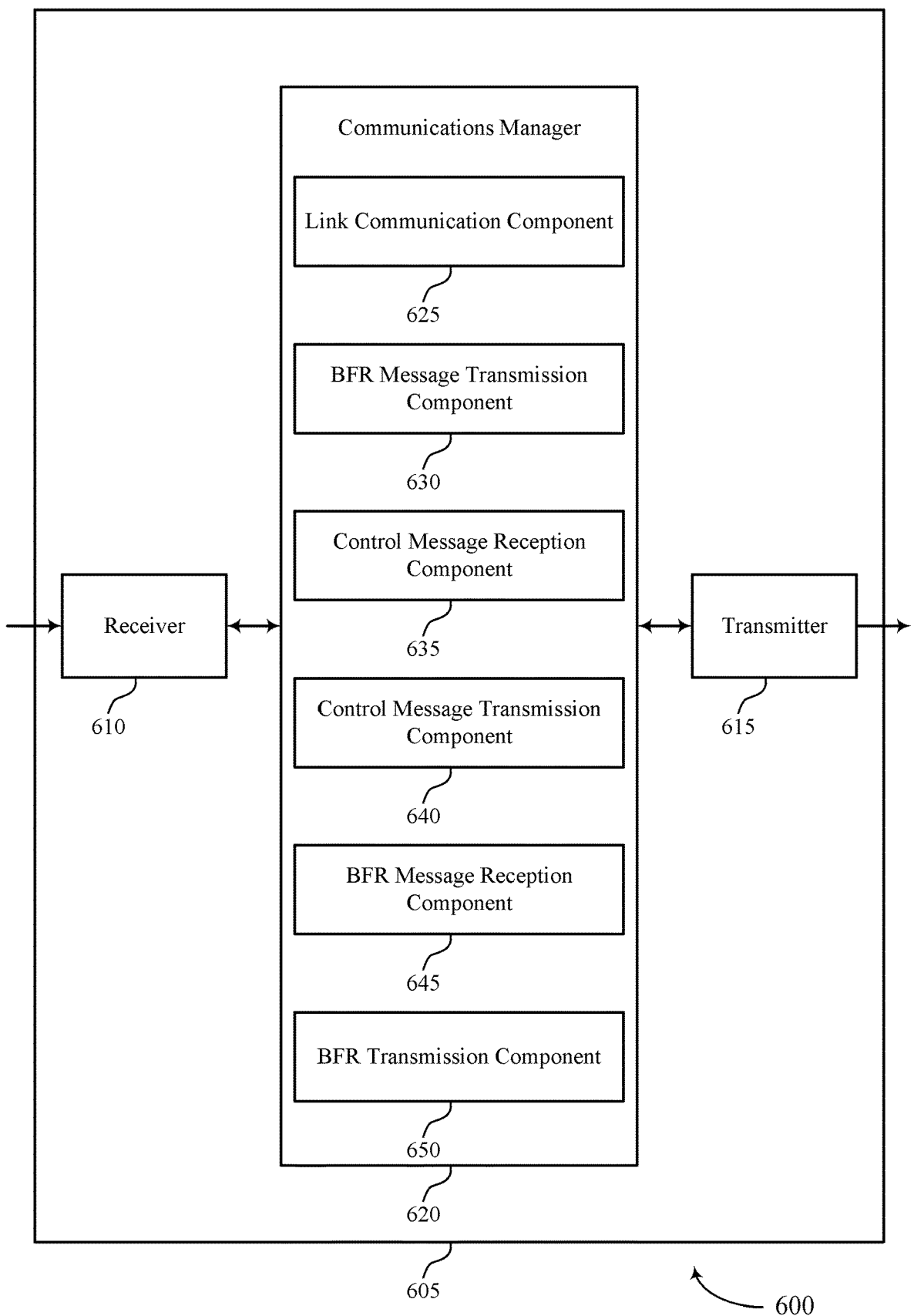

FIG. 6 shows a block diagram 600 of a device 605 that supports BFR via sidelink in accordance with one or more aspects of the present disclosure. The device 605 may be an example of aspects of a device 505 or a UE 115 as described herein. The device 605 may include a receiver 610, a transmitter 615, and a communications manager 620. The device 605 may also include one or more processors, memory coupled with the one or more processors, and instructions stored in the memory that are executable by the one or more processors to enable the one or more processors to perform the BFR features discussed herein. Each of these components may be in communication with one another (e.g., via one or more buses).

The receiver 610 may provide a means for receiving information such as packets, user data, control information, or any combination thereof associated with various information channels (e.g., control channels, data channels, information channels related to BFR via sidelink). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to BFR via sidelink). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of BFR via sidelink as described herein. For example, the communications manager 620 may include a link communication component 625, an BFR message transmission component 630, a control message reception component 635, a control message transmission component 640, an BFR message reception component 645, an BFR transmission component 650, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a first UE in accordance with examples as disclosed herein. The link communication component 625 may be configured as or otherwise support a means for communicating with a network node via a first wireless link using a first beam according to a first beam configuration. The BFR message transmission component 630 may be configured as or otherwise support a means for transmitting to the network node via a second wireless link with a second UE, a BFR message in response to identifying a beam failure for the first beam associated with the first wireless link. The control message reception component 635 may be configured as or otherwise support a means for receiving, at least in part in response to the BFR message, a control message indicating a second beam configuration for the first UE to use to communicate with the network node.

Additionally, or alternatively, the communications manager 620 may support wireless communications at a second UE in accordance with examples as disclosed herein. The control message transmission component 640 may be configured as or otherwise support a means for transmitting a message identifying the second UE and indicating that the second UE has an established communication link between the second UE and a network node. The BFR message reception component 645 may be configured as or otherwise support a means for receiving, from a first UE at least in part in response to the transmitted message, a BFR message identifying a beam failure at the first UE for a first beam associated with a first wireless link between the first UE and the network node. The BFR transmission component 650 may be configured as or otherwise support a means for transmitting, to the network node, the BFR message received from the first UE.

In some cases, the link communication component 625, the BFR message transmission component 630, the control message reception component 635, the control message transmission component 640, the BFR message reception component 645, and the BFR transmission component 650 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the link communication component 625, the BFR message transmission component 630, the control message reception component 635, the control message transmission component 640, the BFR message reception component 645, and the BFR transmission component 650 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 7:
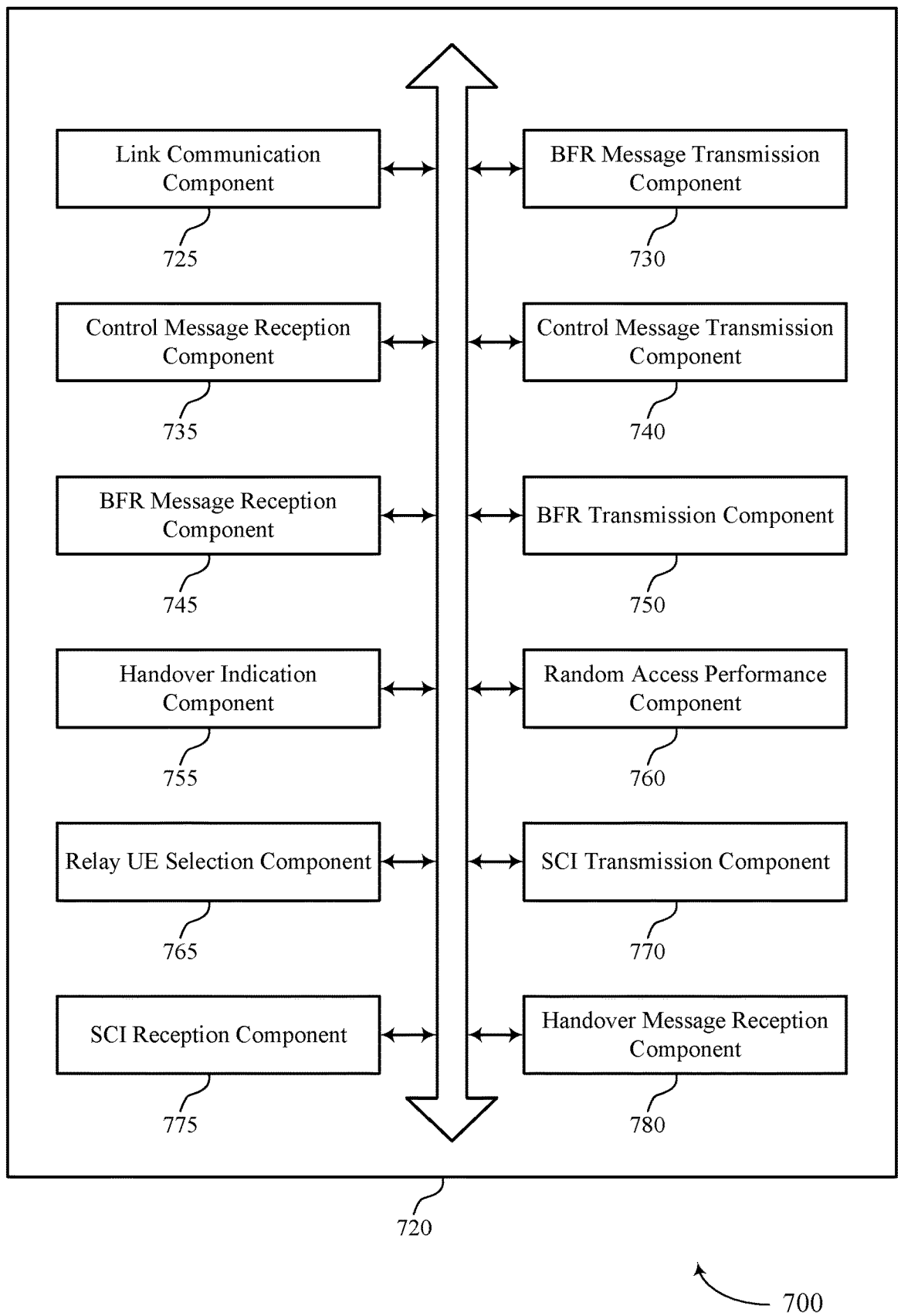
FIG. 7 shows a block diagram of a communications manager that supports BFR via sidelink in accordance with one or more aspects of the present disclosure.

FIG. 7 shows a block diagram 700 of a communications manager 720 that supports BFR via sidelink in accordance with one or more aspects of the present disclosure. The communications manager 720 may be an example of aspects of a communications manager 520, a communications manager 620, or both, as described herein. The communications manager 720, or various components thereof, may be an example of means for performing various aspects of BFR via sidelink as described herein. For example, the communications manager 720 may include a link communication component 725, an BFR message transmission component 730, a control message reception component 735, a control message transmission component 740, an BFR message reception component 745, an BFR transmission component 750, a handover indication component 755, a random access performance component 760, a relay UE selection component 765, an SCI transmission component 770, an SCI reception component 775, a handover message reception component 780, or any combination thereof. Each of these components may communicate, directly or indirectly, with one another (e.g., via one or more buses).

The communications manager 720 may support wireless communications at a first UE in accordance with examples as disclosed herein. The link communication component 725 may be configured as or otherwise support a means for communicating with a network node via a first wireless link using a first beam according to a first beam configuration. The BFR message transmission component 730 may be configured as or otherwise support a means for transmitting to the network node via a second wireless link with a second UE, a BFR message in response to identifying a beam failure for the first beam associated with the first wireless link. The control message reception component 735 may be configured as or otherwise support a means for receiving, at least in part in response to the BFR message, a control message indicating a second beam configuration for the first UE to use to communicate with the network node.

In some examples, the BFR message transmission component 730 may be configured as or otherwise support a means for transmitting the BFR message to the second UE for the second UE to forward to the network node based at least in part on identifying the second UE for sidelink communication via the second wireless link before identifying a new candidate SSB beam associated with the network node.

In some examples, to support transmitting the BFR message, the BFR message transmission component 730 may be configured as or otherwise support a means for transmitting the BFR message to the second UE on the second wireless link for the second UE to forward to the network node based at least in part on identifying that the first UE failed to receive a BFR response to one or more BFR messages transmitted to the network node.

In some examples, the second beam configuration comprises SCI, a set of resource pools, a PSFCH configuration, a set of power control parameters, a set of TCI states, or any combination thereof, for the second wireless link with the second UE.

In some examples, the network node includes a first network node, and the handover indication component 755 may be configured as or otherwise support a means for transmitting, to the second UE on the second wireless link for the second UE to forward to the network node, a message indicating handover of the first UE to a second network node based at least in part on identifying a new cell separate from the network node for the first UE.

In some examples, the network node includes a first network node, and the random access performance component 760 may be configured as or otherwise support a means for performing a random access procedure with a second network node via a RACH. In some examples, the network node includes a first network node, and the control message transmission component 740 may be configured as or otherwise support a means for transmitting, to the first network node, a message cancelling communications with the first network node based on performing the random access procedure with the second network node.

In some examples, the control message reception component 735 may be configured as or otherwise support a means for receiving, from the network node, control signaling indicating a set of sidelink-capable UEs. In some examples, the relay UE selection component 765 may be configured as or otherwise support a means for selecting to transmit the BFR message to the second UE from the set of sidelink-capable UEs indicated by the control signaling.

In some examples, the set of sidelink-capable UEs are ordered according to a sidelink quality metric.

In some examples, the control message reception component 735 may be configured as or otherwise support a means for receiving, from the network node, a control signaling indicating a parameter for communications between the first UE and one or more UEs of the set of sidelink-capable UEs.

In some examples, the parameter includes SCI, a resource pool, a PSFCH configuration, a power control parameter, a TCI state, or any combination thereof.

In some examples, to support transmitting the BFR message, the SCI transmission component 770 may be configured as or otherwise support a means for transmitting, to the second UE, SCI including a first bit indicating that the BFR message is associated with a BFR forwarding request, a second bit indicating whether the first UE is within coverage of the network node, or both.

In some examples, the SCI transmission component 770 may be configured as or otherwise support a means for information identifying a first beam identifier as failed, an indicator of a second beam identifier, a cell identifier associated with the network node, UL data to forward to the network node, or a combination thereof.

In some examples, the SCI transmission component 770 may be configured as or otherwise support a means for a cell identifier associated with the network node, a set of indicators identifying SSBs associated with the network node that fail to satisfy a power threshold, or any combination thereof.

In some examples, to support transmitting the BFR message, the BFR message transmission component 730 may be configured as or otherwise support a means for transmitting the BFR message to the second UE based on identifying that the first UE failed to receive an acknowledgment to a previously-transmitted BFR message transmitted via sidelink to a third UE.

In some examples, the BFR message transmission component 730 may be configured as or otherwise support a means for concurrently transmitting the BFR message via sidelink to a plurality of sidelink UEs, including the second UE.

In some examples, the relay UE selection component 765 may be configured as or otherwise support a means for selecting to transmit the BFR message to the second UE based on identifying that the second UE and the first UE are associated with a same cell identifier.

In some examples, the control message reception component 735 may be configured as or otherwise support a means for receiving, from each UE of a set of neighboring sidelink UEs, a respective link quality metric for a communication link between the UE and the network node. In some examples, the relay UE selection component 765 may be configured as or otherwise support a means for selecting the second UE from the set of neighboring sidelink UEs based at least in part on the second UE having a link quality metric that satisfies a threshold.

Additionally, or alternatively, the communications manager 720 may support wireless communications at a second UE in accordance with examples as disclosed herein. The control message transmission component 740 may be configured as or otherwise support a means for transmitting a message identifying the second UE and indicating that the second UE has an established communication link between the second UE and a network node. The BFR message reception component 745 may be configured as or otherwise support a means for receiving, from a first UE at least in part in response to the transmitted message, a BFR message identifying a beam failure at the first UE for a first beam associated with a first wireless link between the first UE and the network node. The BFR transmission component 750 may be configured as or otherwise support a means for transmitting, to the network node, the BFR message received from the first UE.

In some examples, to support transmitting the message, the control message transmission component 740 may be configured as or otherwise support a means for transmitting a link quality metric associated with the established communication link between the second UE and the network node.

In some examples, to support receiving the BFR message, the SCI reception component 775 may be configured as or otherwise support a means for receiving SCI including a first bit indicating a BFR forwarding request, a second bit indicating whether the first UE is within coverage of the network node, or both.

In some examples, the SCI reception component 775 may be configured as or otherwise support a means for information identifying a first beam identifier as failed, an indicator of a second beam identifier, a cell identifier associated with the network node, UL data to forward to the network node, or a combination thereof.

In some examples, the SCI reception component 775 may be configured as or otherwise support a means for a cell identifier associated with the network node, a set of SSBs associated with the network node with respective reference signal received powers satisfying a threshold, or a combination thereof.

In some examples, the control message reception component 735 may be configured as or otherwise support a means for receiving, from the network node, a radio resource control signal indicating for the second UE to relay traffic between the network node and the first UE. In some examples, the link communication component 725 may be configured as or otherwise support a means for communicating traffic between the network node and the first UE in accordance with receiving the radio resource control signal.

In some examples, the handover message reception component 780 may be configured as or otherwise support a means for receiving, from the first UE, a handover message indicating handover for the first UE to a second network node. In some examples, the handover indication component 755 may be configured as or otherwise support a means for transmitting, to the network node, the handover message received from the first UE.

In some cases, the link communication component 725, the BFR message transmission component 730, the control message reception component 735, the control message transmission component 740, the BFR message reception component 745, the BFR transmission component 750, the handover indication component 755, the random access performance component 760, the relay UE selection component 765, the SCI transmission component 770, the SCI reception component 775, and the handover message reception component 780 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the link communication component 725, the BFR message transmission component 730, the control message reception component 735, the control message transmission component 740, the BFR message reception component 745, the BFR transmission component 750, the handover indication component 755, the random access performance component 760, the relay UE selection component 765, the SCI transmission component 770, the SCI reception component 775, and the handover message reception component 780 discussed herein.

Figure 8:
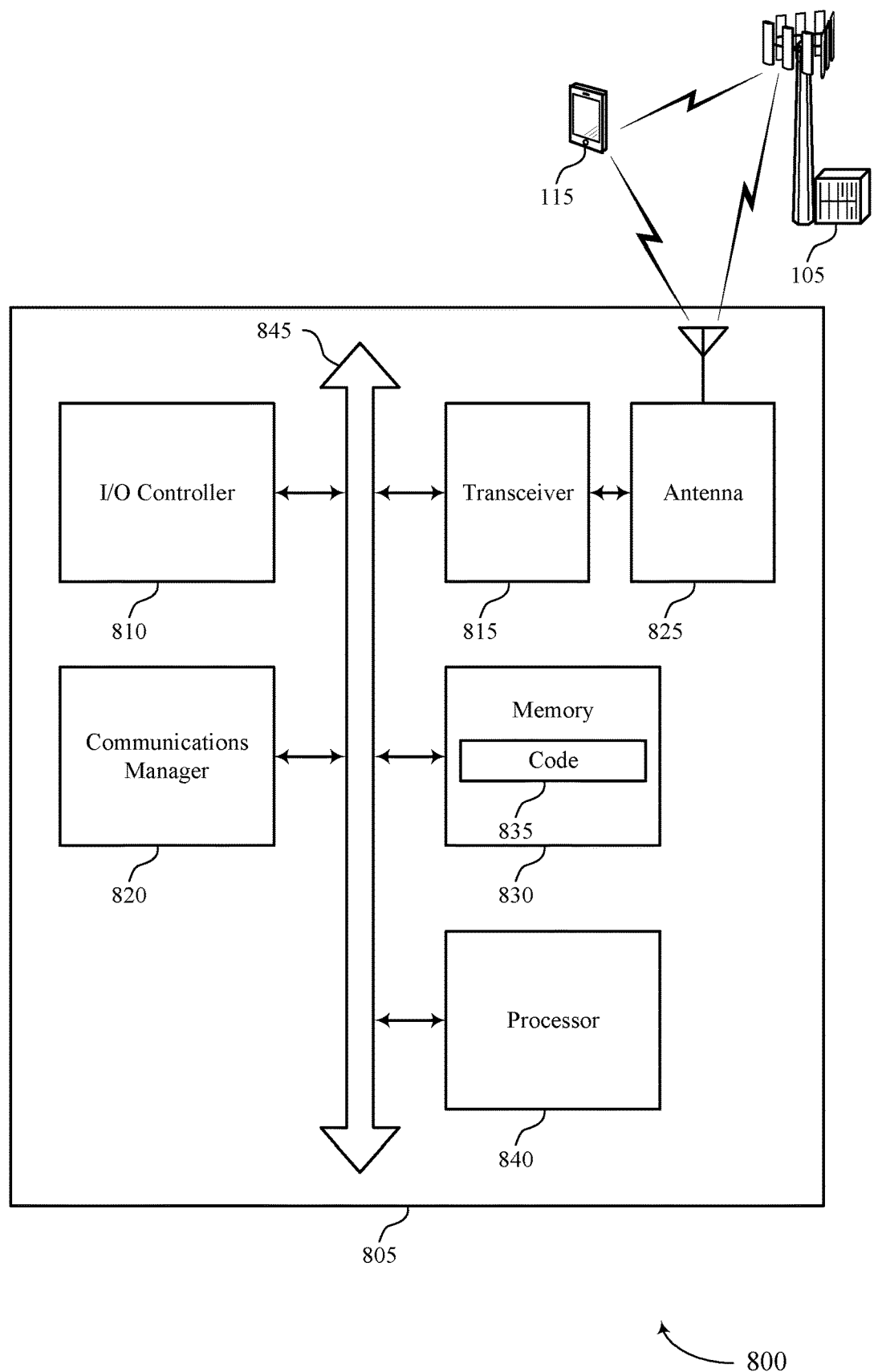
FIG. 8 shows a diagram of a system including a device that supports BFR via sidelink in accordance with one or more aspects of the present disclosure.

FIG. 8 shows a diagram of a system 800 including a device 805 that supports BFR via sidelink in accordance with one or more aspects of the present disclosure. The device 805 may be an example of or include the components of a device 505, a device 605, or a UE 115 as described herein. The device 805 may communicate (e.g., wirelessly) with one or more network nodes 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting BFR via sidelink). For example, the device 805 or a component of the device 805 may include a processor 840 and memory 830 coupled with or to the processor 840, the processor 840 and memory 830 configured to perform various functions described herein.

The communications manager 820 may support wireless communications at a first UE in accordance with examples as disclosed herein. For example, the communications manager 820 may be configured as or otherwise support a means for communicating with a network node via a first wireless link using a first beam according to a first beam configuration. The communications manager 820 may be configured as or otherwise support a means for transmitting to the network node via a second wireless link with a second UE, a BFR message in response to identifying a beam failure for the first beam associated with the first wireless link. The communications manager 820 may be configured as or otherwise support a means for receiving, at least in part in response to the BFR message, a control message indicating a second beam configuration for the first UE to use to communicate with the network node.

Additionally, or alternatively, the communications manager 820 may support wireless communications at a second UE in accordance with examples as disclosed herein. For example, the communications manager 820 may be configured as or otherwise support a means for transmitting a message identifying the second UE and indicating that the second UE has an established communication link between the second UE and a network node. The communications manager 820 may be configured as or otherwise support a means for receiving, from a first UE at least in part in response to the transmitted message, a BFR message identifying a beam failure at the first UE for a first beam associated with a first wireless link between the first UE and the network node. The communications manager 820 may be configured as or otherwise support a means for transmitting, to the network node, the BFR message received from the first UE.

By including or configuring the communications manager 820 in accordance with examples as described herein, the device 805) may support techniques for sidelink based BFR messaging which may result in improved communication reliability, reduced latency, improved user experience related to reduced processing, reduced power consumption, more efficient utilization of communication resources, improved coordination between devices, longer battery life, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of BFR via sidelink as described herein, or the processor 840 and the memory 830 may be otherwise configured to perform or support such operations.

Figure 9:
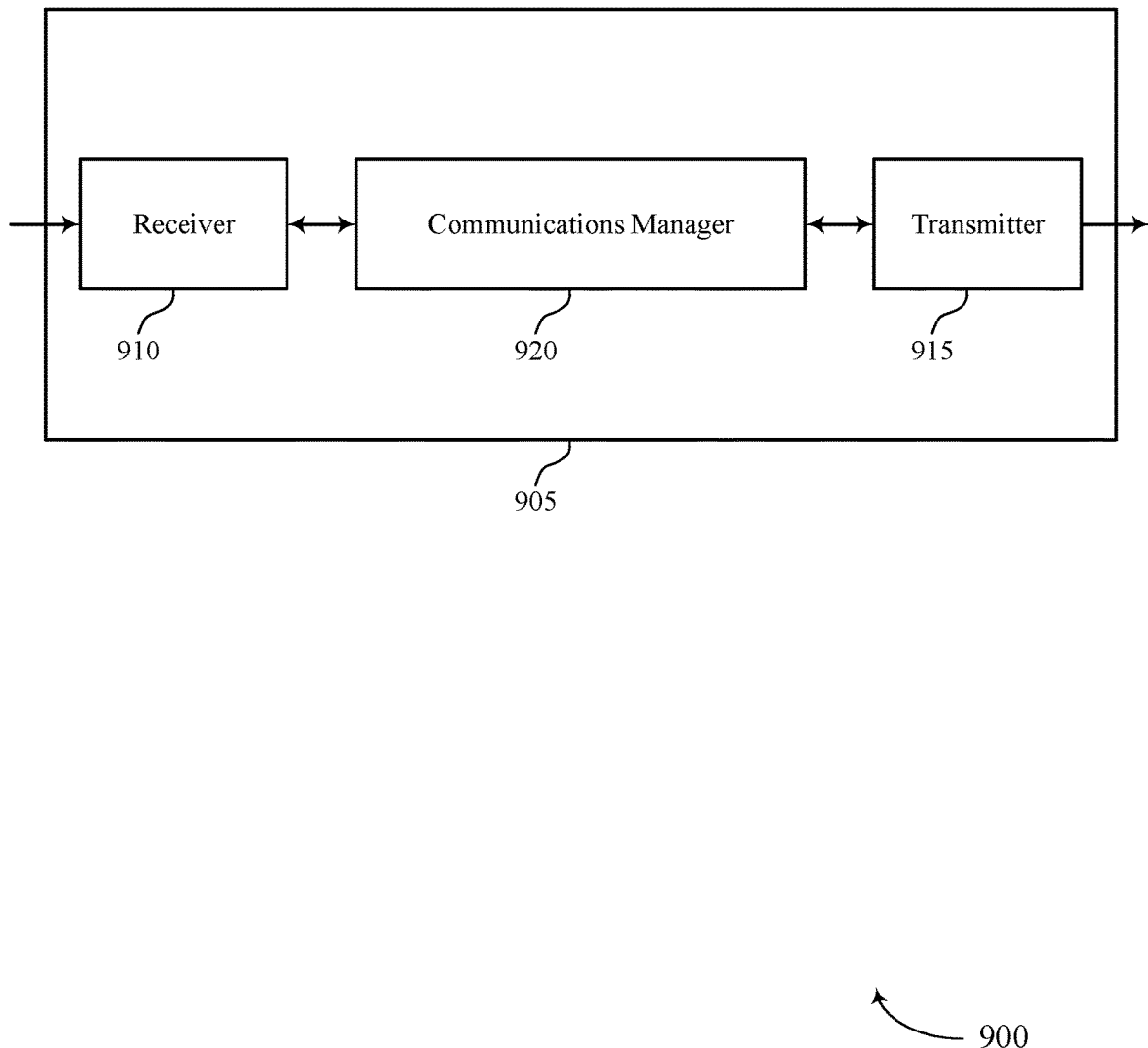
FIGS. 9 and 10 show block diagrams of devices that support BFR via sidelink in accordance with one or more aspects of the present disclosure.

FIG. 9 shows a block diagram 900 of a device 905 that supports BFR via sidelink in accordance with one or more aspects of the present disclosure. The device 905 may be an example of aspects of a network node 105 as described herein. The device 905 may include a receiver 910, a transmitter 915, and a communications manager 920. The device 905 may also include one or more processors, memory coupled with the one or more processors, and instructions stored in the memory that are executable by the one or more processors to enable the one or more processors to perform the BFR features discussed herein. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of BFR via sidelink as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network node in accordance with examples as disclosed herein. For example, the communications manager 920 may be configured as or otherwise support a means for communicating with a first UE via a first wireless link according to a first beam configuration that identifies a first beam. The communications manager 920 may be configured as or otherwise support a means for receiving, from the first UE via a second wireless link between the first UE and a second UE and via a third wireless link between the network node and the second UE, a BFR message identifying a beam failure at the first UE for the first beam associated with the first wireless link. The communications manager 920 may be configured as or otherwise support a means for transmitting, at least in part in response to the received BFR message, a control message indicating a second beam configuration for the first UE to use to communicate with the network node.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for sidelink based BFR messaging which may result in reduced processing, reduced power consumption, and more efficient utilization of communication resources.

Figure 10:
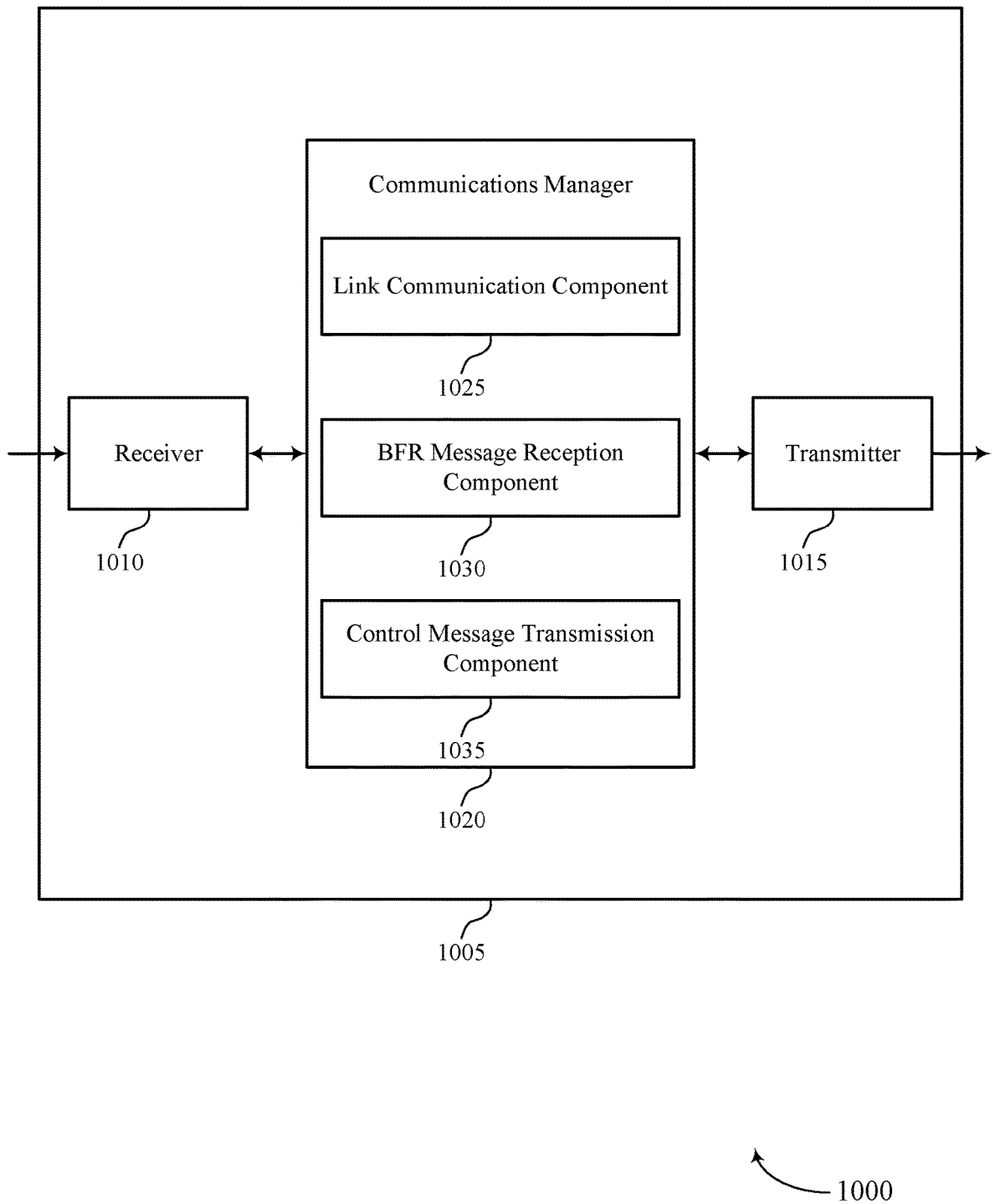

FIG. 10 shows a block diagram 1000 of a device 1005 that supports BFR via sidelink in accordance with one or more aspects of the present disclosure. The device 1005 may be an example of aspects of a device 905 or a network node 105 as described herein. The device 1005 may include a receiver 1010, a transmitter 1015, and a communications manager 1020. The device 1005 may also include one or more processors, memory coupled with the one or more processors, and instructions stored in the memory that are executable by the one or more processors to enable the one or more processors to perform the BFR features discussed herein. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of BFR via sidelink as described herein. For example, the communications manager 1020 may include a link communication component 1025, an BFR message reception component 1030, a control message transmission component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network node in accordance with examples as disclosed herein. The link communication component 1025 may be configured as or otherwise support a means for communicating with a first UE via a first wireless link according to a first beam configuration that identifies a first beam. The BFR message reception component 1030 may be configured as or otherwise support a means for receiving, from the first UE via a second wireless link between the first UE and a second UE and via a third wireless link between the network node and the second UE, a BFR message identifying a beam failure at the first UE for the first beam associated with the first wireless link. The control message transmission component 1035 may be configured as or otherwise support a means for transmitting, at least in part in response to the received BFR message, a control message indicating a second beam configuration for the first UE to use to communicate with the network node.

In some cases, the link communication component 1025, the BFR message reception component 1030, and the control message transmission component 1035 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the link communication component 1025, the BFR message reception component 1030, and the control message transmission component 1035 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 11:
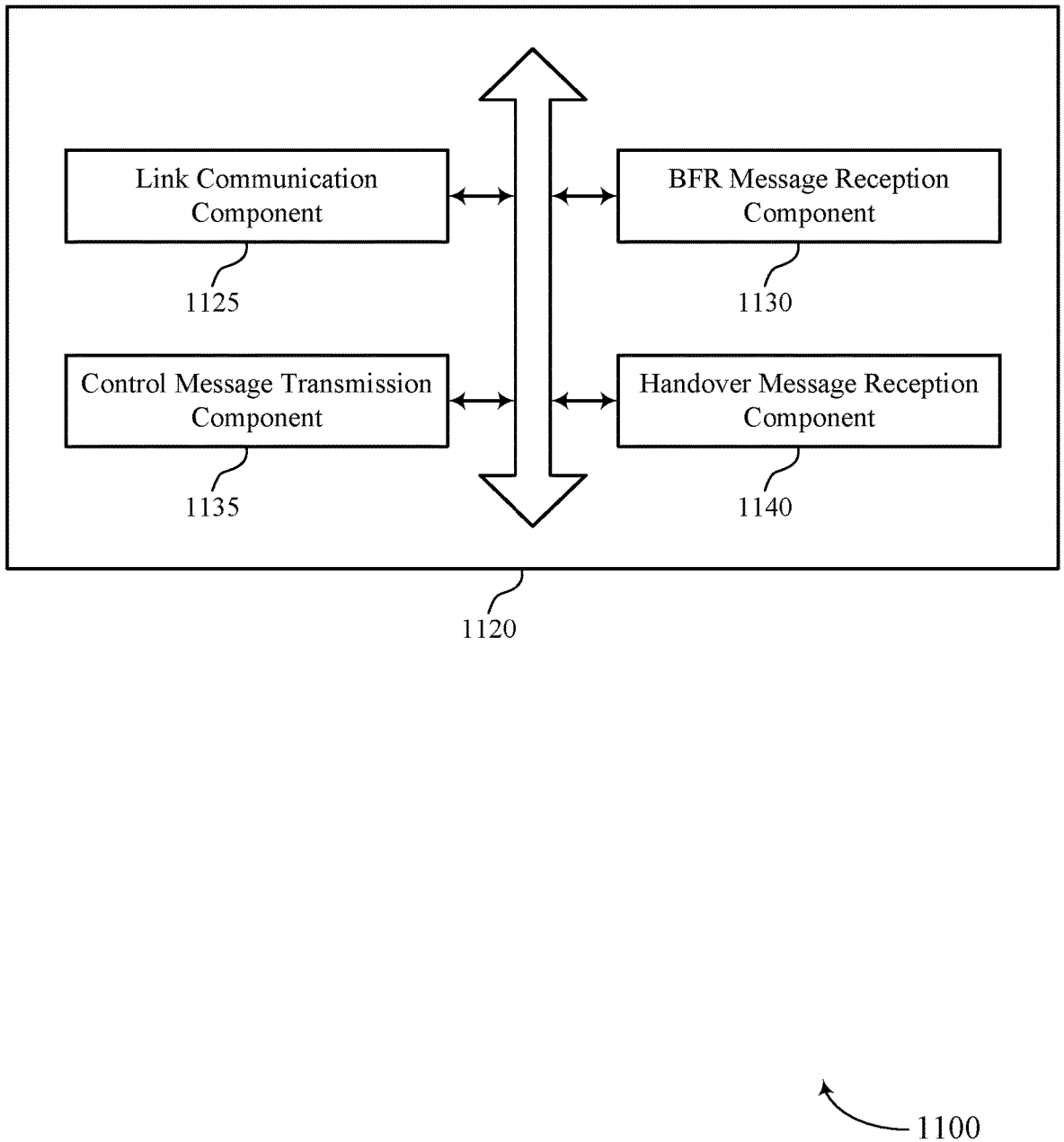
FIG. 11 shows a block diagram of a communications manager that supports BFR via sidelink in accordance with one or more aspects of the present disclosure.

FIG. 11 shows a block diagram 1100 of a communications manager 1120 that supports BFR via sidelink in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of BFR via sidelink as described herein. For example, the communications manager 1120 may include a link communication component 1125, an BFR message reception component 1130, a control message transmission component 1135, a handover message reception component 1140, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network node 105, between devices, components, or virtualized components associated with a network node 105), or any combination thereof.

The communications manager 1120 may support wireless communications at a network node in accordance with examples as disclosed herein. The link communication component 1125 may be configured as or otherwise support a means for communicating with a first UE via a first wireless link according to a first beam configuration that identifies a first beam. The BFR message reception component 1130 may be configured as or otherwise support a means for receiving, from the first UE via a second wireless link between the first UE and a second UE and via a third wireless link between the network node and the second UE, a BFR message identifying a beam failure at the first UE for the first beam associated with the first wireless link. The control message transmission component 1135 may be configured as or otherwise support a means for transmitting, at least in part in response to the received BFR message, a control message indicating a second beam configuration for the first UE to use to communicate with the network node.

In some examples, to support transmitting the control message, the control message transmission component 1135 may be configured as or otherwise support a means for transmitting to the first UE via the third wireless link, the control message indicating the second beam configuration for the first UE to use to communicate with the network node, where the second beam configuration includes a second beam.

In some examples, to support transmitting the control message, the control message transmission component 1135 may be configured as or otherwise support a means for transmitting, to the second UE, a radio resource control signal indicating for the second UE to relay traffic between the network node and the first UE. In some examples, to support transmitting the control message, the link communication component 1125 may be configured as or otherwise support a means for communicating the traffic, with the first UE via the second UE in accordance with transmitting the radio resource control signal.

In some examples, the handover message reception component 1140 may be configured as or otherwise support a means for receiving, from the first UE via the second UE, a hand over message indicating handover for the first UE to a second network node. In some examples, the link communication component 1125 may be configured as or otherwise support a means for canceling communication traffic with the first UE based on receiving the hand over message.

In some examples, the handover message reception component 1140 may be configured as or otherwise support a means for receiving, from a second network node, a hand over message indicating handover for the first UE to the second network node. In some examples, the link communication component 1125 may be configured as or otherwise support a means for canceling communication traffic with the first UE based on receiving the hand over message.

In some cases, the link communication component 1125, the BFR message reception component 1130, the control message transmission component 1135, and the handover message reception component 1140 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the link communication component 1125, the BFR message reception component 1130, the control message transmission component 1135, and the handover message reception component 1140 discussed herein.

Figure 12:
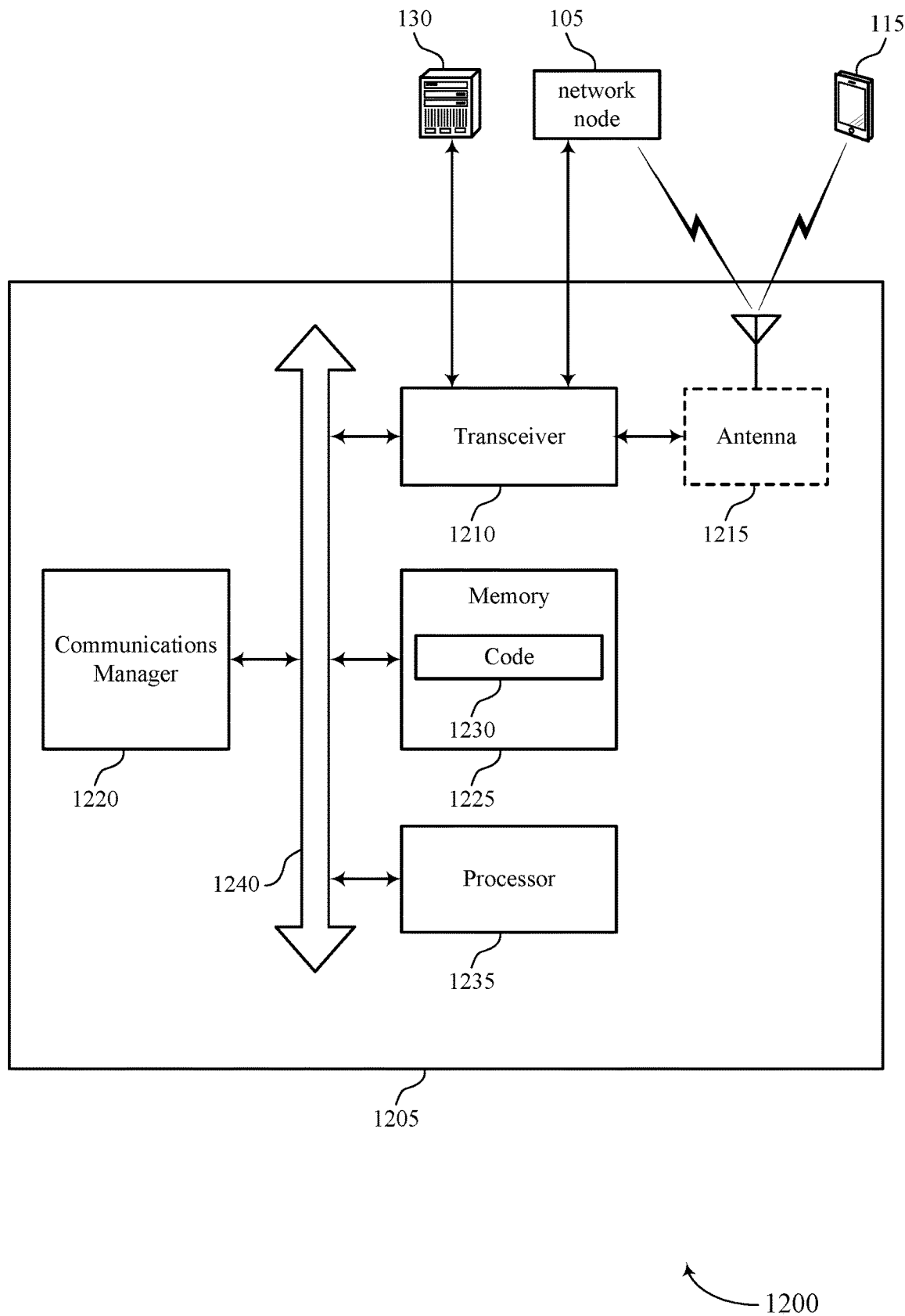
FIG. 12 shows a diagram of a system including a device that supports BFR via sidelink in accordance with one or more aspects of the present disclosure.

FIG. 12 shows a diagram of a system 1200 including a device 1205 that supports BFR via sidelink in accordance with one or more aspects of the present disclosure. The device 1205 may be an example of or include the components of a device 905, a device 1005, or a network node 105 as described herein. The device 1205 may communicate with one or more network nodes 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. The transceiver 1210, or the transceiver 1210 and one or more antennas 1215 or wired interfaces, where applicable, may be an example of a transmitter 915, a transmitter 1015, a receiver 910, a receiver 1010, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting BFR via sidelink). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network nodes 105, and may include a controller or scheduler for controlling communications with UEs 115 in cooperation with other network nodes 105. In some examples, the communications manager 1220 may support an X2 interface within an LTE/LTE-A wireless communications network technology to provide communication between network nodes 105.

The communications manager 1220 may support wireless communications at a network node in accordance with examples as disclosed herein. For example, the communications manager 1220 may be configured as or otherwise support a means for communicating with a first UE via a first wireless link according to a first beam configuration that identifies a first beam. The communications manager 1220 may be configured as or otherwise support a means for receiving, from the first UE via a second wireless link between the first UE and a second UE and via a third wireless link between the network node and the second UE, a BFR message identifying a beam failure at the first UE for the first beam associated with the first wireless link. The communications manager 1220 may be configured as or otherwise support a means for transmitting, at least in part in response to the received BFR message, a control message indicating a second beam configuration for the first UE to use to communicate with the network node.

By including or configuring the communications manager 1220 in accordance with examples as described herein, the device 1205 may support techniques for sidelink based BFR messaging which may result in improved communication reliability, reduced latency, improved user experience related to reduced processing, reduced power consumption, more efficient utilization of communication resources, improved coordination between devices, longer battery life, and improved utilization of processing capability.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the processor 1235, the memory 1225, the code 1230, the transceiver 1210, or any combination thereof. For example, the code 1230 may include instructions executable by the processor 1235 to cause the device 1205 to perform various aspects of BFR via sidelink as described herein, or the processor 1235 and the memory 1225 may be otherwise configured to perform or support such operations.

Figure 13:
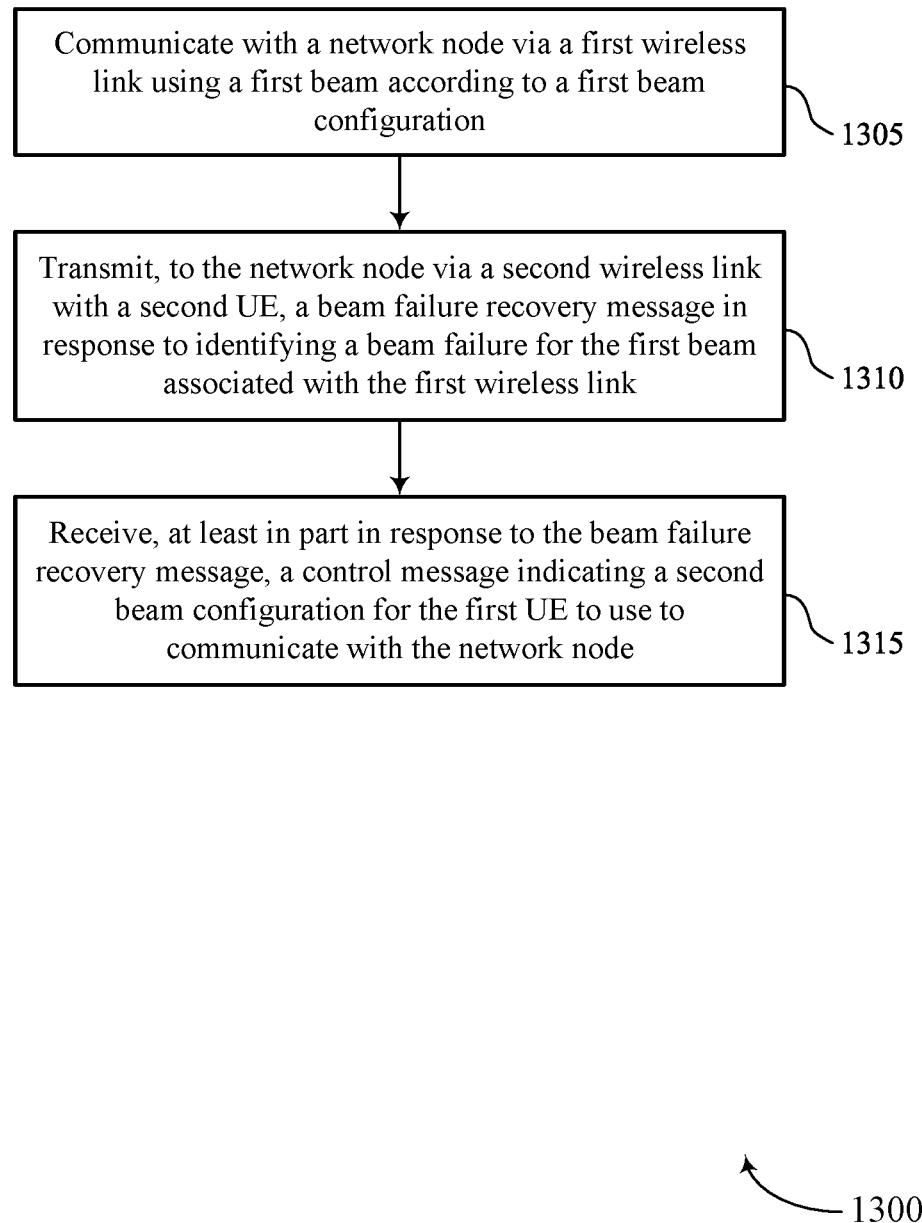
FIGS. 13 through 18 show flowcharts illustrating methods that support BFR via sidelink in accordance with one or more aspects of the present disclosure.

FIG. 13 shows a flowchart illustrating a method 1300 that supports BFR via sidelink in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include communicating with a network node via a first wireless link using a first beam according to a first beam configuration. The operations of 1305 may be performed in accordance with examples as disclosed herein. In some examples, aspects of the operations of 1305 may be performed by a link communication component 725 as described with reference to FIG. 7.

At 1310, the method may include transmitting, to the network node via a second wireless link with a second UE, a BFR message in response to identifying a beam failure for the first beam associated with the first wireless link. The operations of 1310 may be performed in accordance with examples as disclosed herein. In some examples, aspects of the operations of 1310 may be performed by an BFR message transmission component 730 as described with reference to FIG. 7.

At 1315, the method may include receiving, at least in part in response to the BFR message, a control message indicating a second beam configuration for the first UE to use to communicate with the network node. The operations of 1315 may be performed in accordance with examples as disclosed herein. In some examples, aspects of the operations of 1315 may be performed by a control message reception component 735 as described with reference to FIG. 7.

Figure 14:
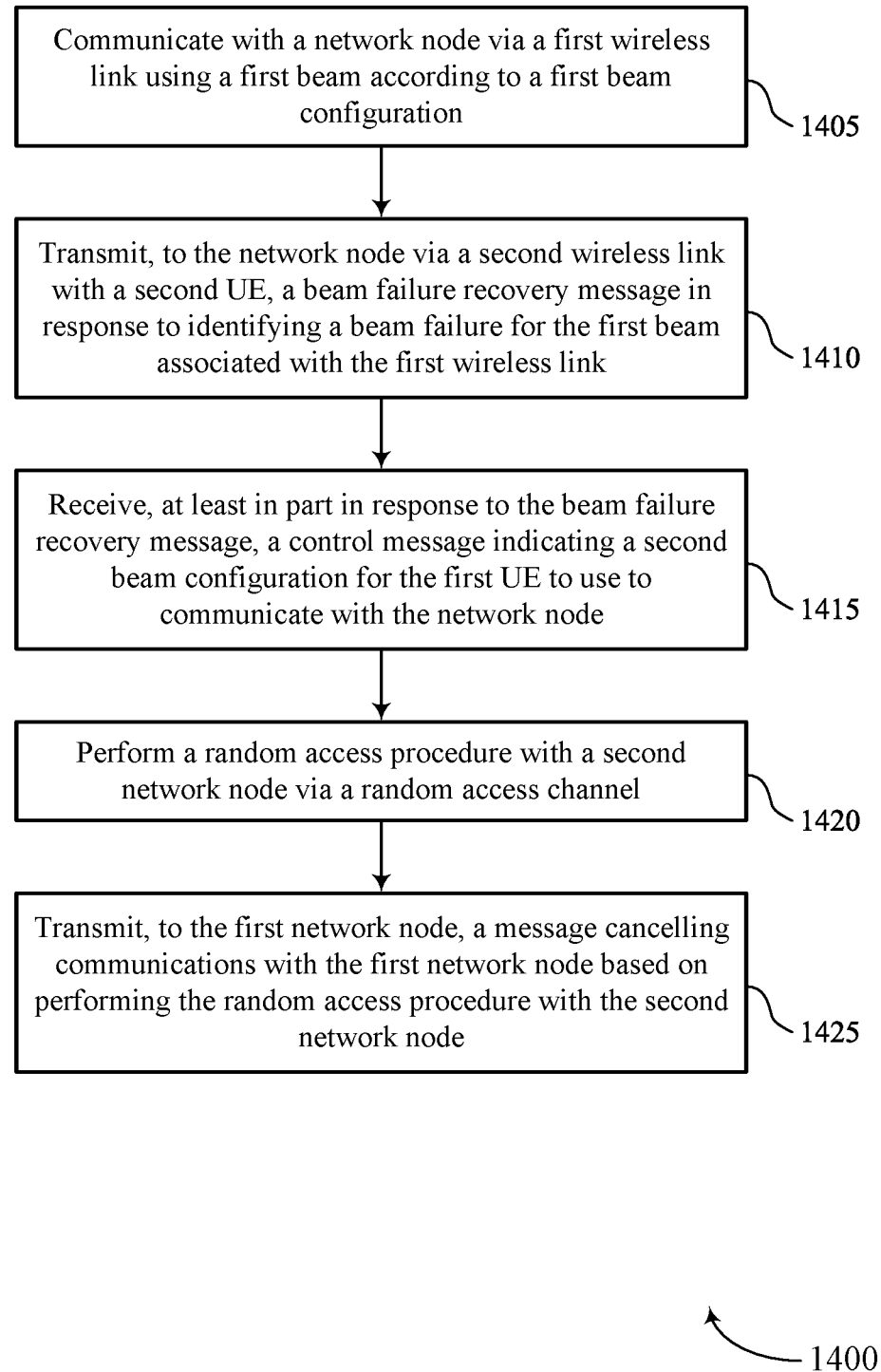

FIG. 14 shows a flowchart illustrating a method 1400 that supports BFR via sidelink in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include communicating with a network node via a first wireless link using a first beam according to a first beam configuration. The operations of 1405 may be performed in accordance with examples as disclosed herein. In some examples, aspects of the operations of 1405 may be performed by a link communication component 725 as described with reference to FIG. 7.

At 1410, the method may include transmitting, to the network node via a second wireless link with a second UE, a BFR message in response to identifying a beam failure for the first beam associated with the first wireless link. The operations of 1410 may be performed in accordance with examples as disclosed herein. In some examples, aspects of the operations of 1410 may be performed by an BFR message transmission component 730 as described with reference to FIG. 7.

At 1415, the method may include receiving, at least in part in response to the BFR message, a control message indicating a second beam configuration for the first UE to use to communicate with the network node. The operations of 1415 may be performed in accordance with examples as disclosed herein. In some examples, aspects of the operations of 1415 may be performed by a control message reception component 735 as described with reference to FIG. 7.

At 1420, the method may include performing a random access procedure with a second network node via a RACH. The operations of 1420 may be performed in accordance with examples as disclosed herein. In some examples, aspects of the operations of 1420 may be performed by a random access performance component 760 as described with reference to FIG. 7.

At 1425, the method may include transmitting, to the first network node, a message cancelling communications with the first network node based on performing the random access procedure with the second network node. The operations of 1425 may be performed in accordance with examples as disclosed herein. In some examples, aspects of the operations of 1425 may be performed by a control message transmission component 740 as described with reference to FIG. 7.

Figure 15:
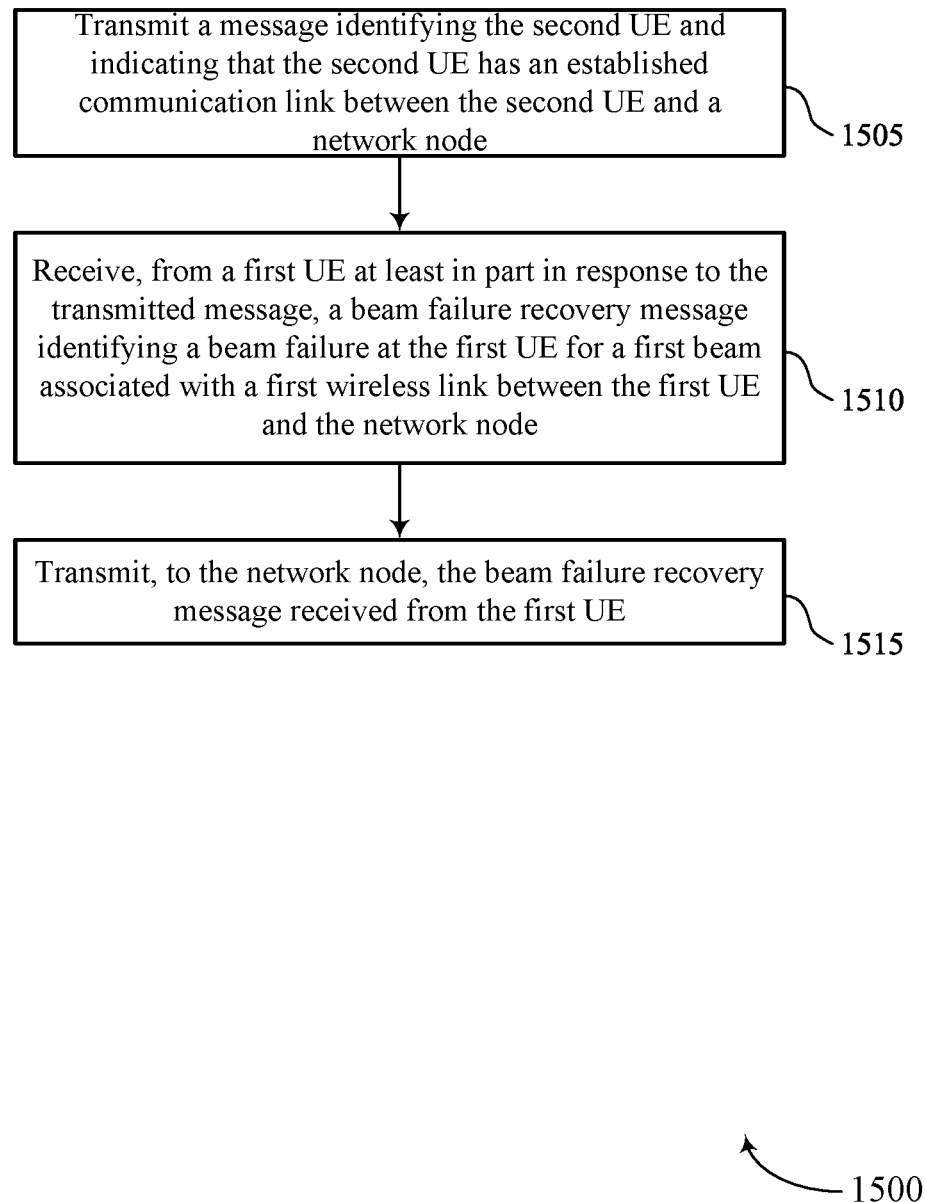

FIG. 15 shows a flowchart illustrating a method 1500 that supports BFR via sidelink in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include transmitting a message identifying the second UE and indicating that the second UE has an established communication link between the second UE and a network node. The operations of 1505 may be performed in accordance with examples as disclosed herein. In some examples, aspects of the operations of 1505 may be performed by a control message transmission component 740 as described with reference to FIG. 7.

At 1510, the method may include receiving, from a first UE at least in part in response to the transmitted message, a BFR message identifying a beam failure at the first UE for a first beam associated with a first wireless link between the first UE and the network node. The operations of 1510 may be performed in accordance with examples as disclosed herein. In some examples, aspects of the operations of 1510 may be performed by an BFR message reception component 745 as described with reference to FIG. 7.

At 1515, the method may include transmitting, to the network node, the BFR message received from the first UE. The operations of 1515 may be performed in accordance with examples as disclosed herein. In some examples, aspects of the operations of 1515 may be performed by an BFR transmission component 750 as described with reference to FIG. 7.

Figure 16:
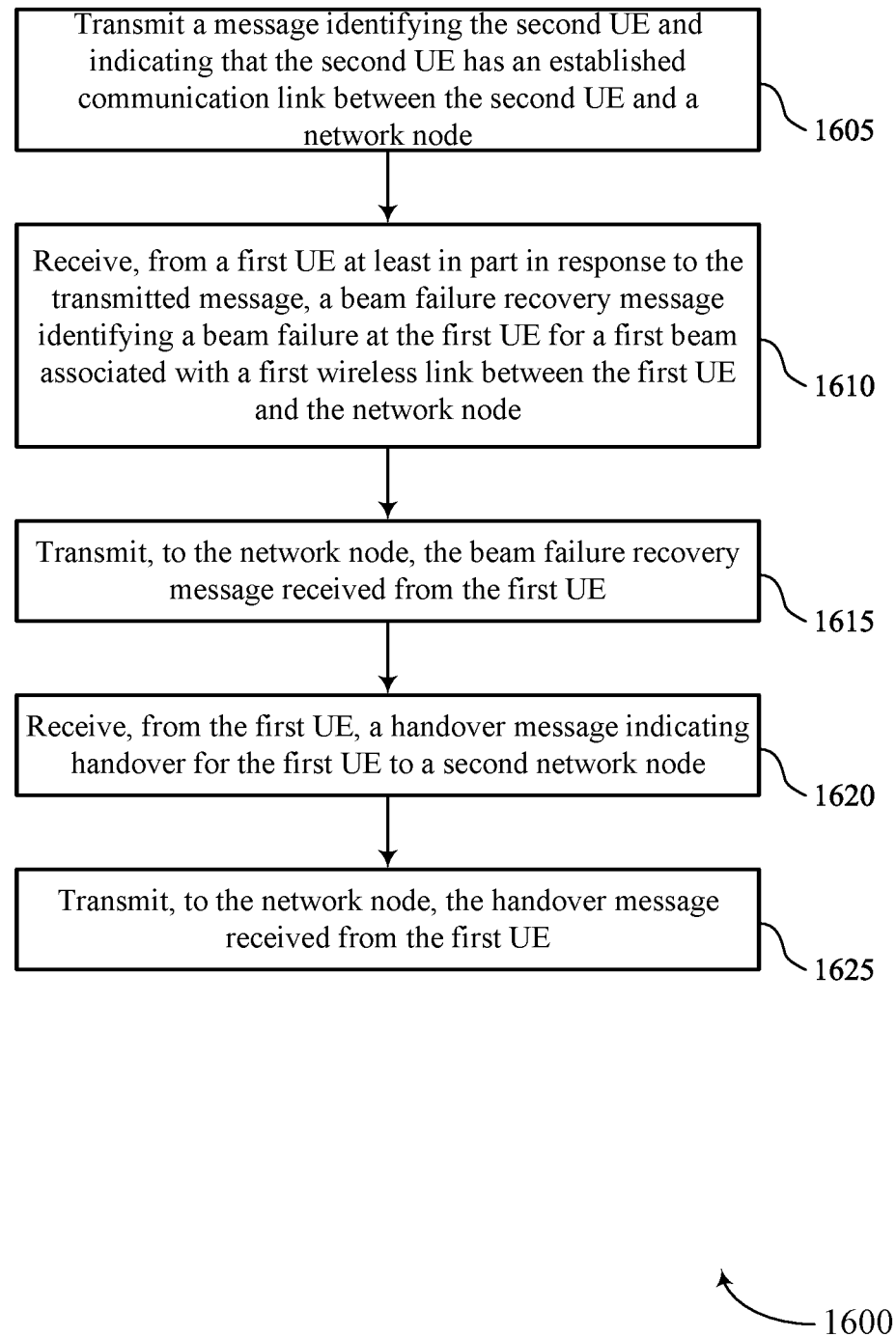

FIG. 16 shows a flowchart illustrating a method 1600 that supports BFR via sidelink in accordance with one or more aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1605, the method may include transmitting a message identifying the second UE and indicating that the second UE has an established communication link between the second UE and a network node. The operations of 1605 may be performed in accordance with examples as disclosed herein. In some examples, aspects of the operations of 1605 may be performed by a control message transmission component 740 as described with reference to FIG. 7.

At 1610, the method may include receiving, from a first UE at least in part in response to the transmitted message, a BFR message identifying a beam failure at the first UE for a first beam associated with a first wireless link between the first UE and the network node. The operations of 1610 may be performed in accordance with examples as disclosed herein. In some examples, aspects of the operations of 1610 may be performed by an BFR message reception component 745 as described with reference to FIG. 7.

At 1615, the method may include transmitting, to the network node, the BFR message received from the first UE. The operations of 1615 may be performed in accordance with examples as disclosed herein. In some examples, aspects of the operations of 1615 may be performed by an BFR transmission component 750 as described with reference to FIG. 7.

At 1620, the method may include receiving, from the first UE, a handover message indicating handover for the first UE to a second network node. The operations of 1620 may be performed in accordance with examples as disclosed herein. In some examples, aspects of the operations of 1620 may be performed by a handover message reception component 780 as described with reference to FIG. 7.

At 1625, the method may include transmitting, to the network node, the handover message received from the first UE. The operations of 1625 may be performed in accordance with examples as disclosed herein. In some examples, aspects of the operations of 1625 may be performed by a handover indication component 755 as described with reference to FIG. 7.

Figure 17:
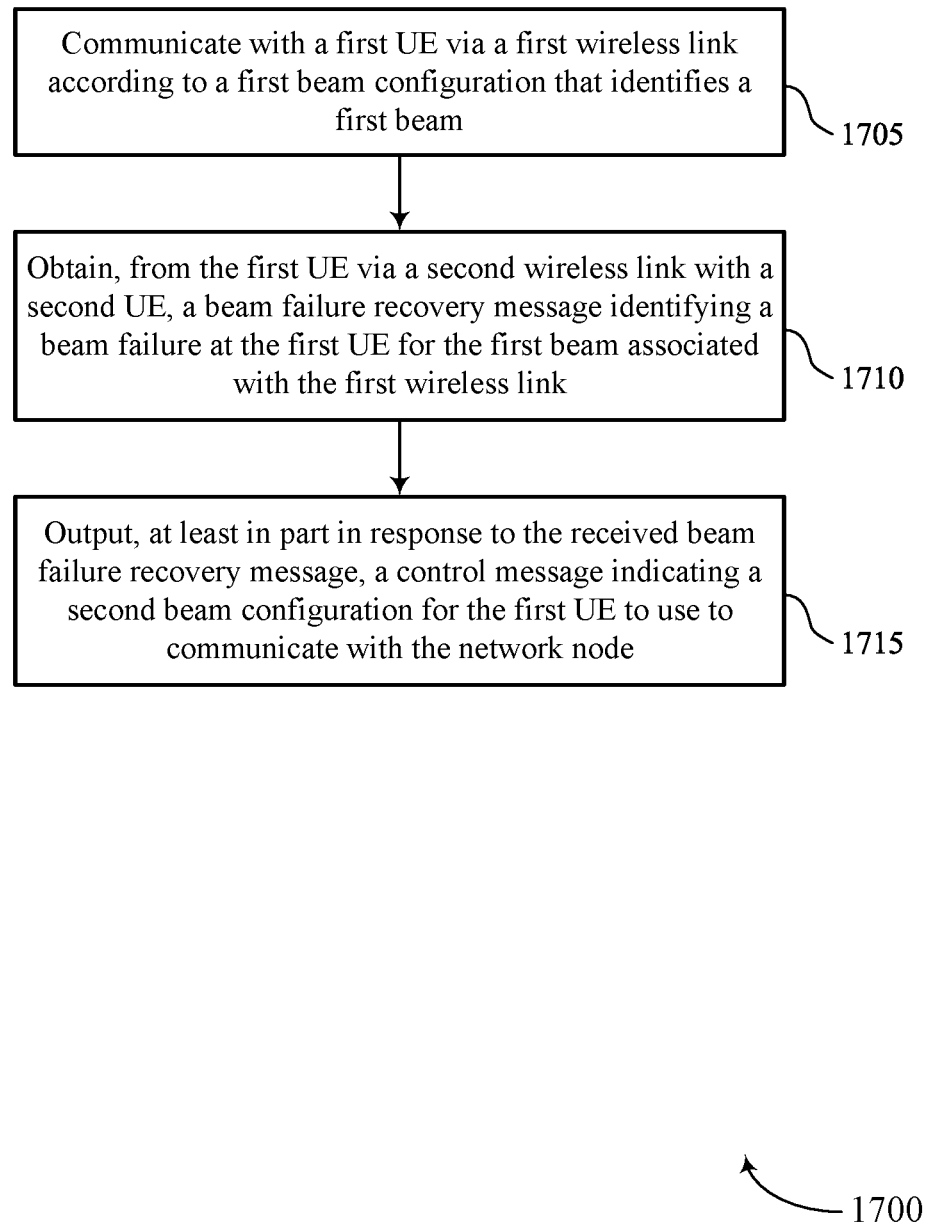

FIG. 17 shows a flowchart illustrating a method 1700 that supports BFR via sidelink in accordance with one or more aspects of the present disclosure. The operations of the method 1700 may be implemented by a network node or its components as described herein. For example, the operations of the method 1700 may be performed by a network node as described with reference to FIGS. 1 through 4 and 9 through 12. In some examples, a network node may execute a set of instructions to control the functional elements of the network node to perform the described functions. Additionally, or alternatively, the network node may perform aspects of the described functions using special-purpose hardware.

At 1705, the method may include communicating with (e.g., transmitting to, receiving from, or both) a first UE via a first wireless link according to a first beam configuration that identifies a first beam. The operations of 1705 may be performed in accordance with examples as disclosed herein. In some examples, aspects of the operations of 1705 may be performed by a link communication component 1125 as described with reference to FIG. 11.

At 1710, the method may include obtaining (e.g., receiving), from the first UE via a second wireless link between the first UE and a second UE and via a third wireless link between the network node and the second UE, a BFR message identifying a beam failure at the first UE for the first beam associated with the first wireless link. The operations of 1710 may be performed in accordance with examples as disclosed herein. In some examples, aspects of the operations of 1710 may be performed by an BFR message reception component 1130 as described with reference to FIG. 11.

At 1715, the method may include outputting (e.g., transmitting), at least in part in response to the obtained BFR message, a control message indicating a second beam configuration for the first UE to use to communicate with the network node. The operations of 1715 may be performed in accordance with examples as disclosed herein. In some examples, aspects of the operations of 1715 may be performed by a control message transmission component 1135 as described with reference to FIG. 11.

Figure 18:
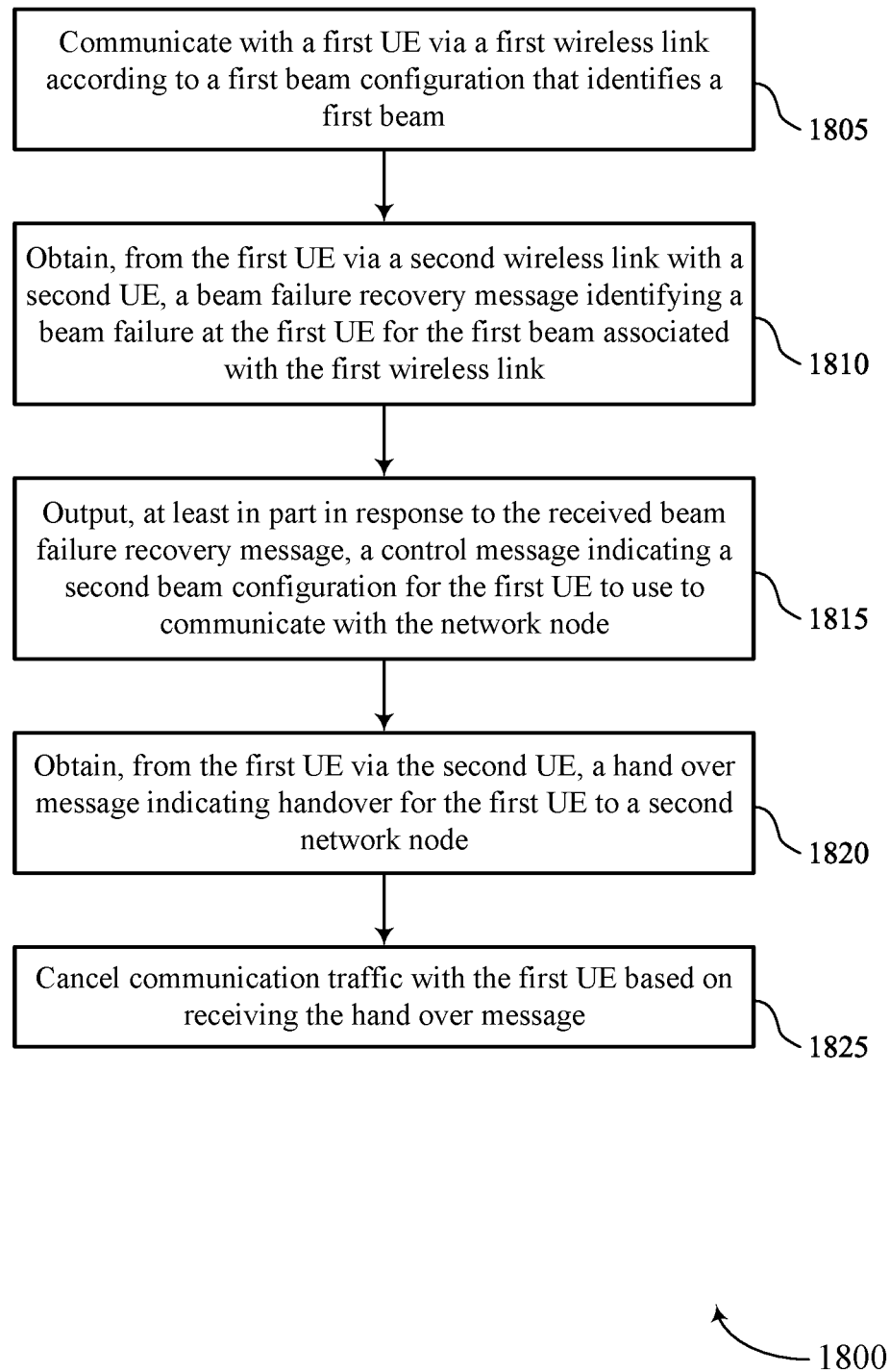

FIG. 18 shows a flowchart illustrating a method 1800 that supports BFR via sidelink in accordance with one or more aspects of the present disclosure. The operations of the method 1800 may be implemented by a network node or its components as described herein. For example, the operations of the method 1800 may be performed by a network node as described with reference to FIGS. 1 through 4 and 9 through 12. In some examples, a network node may execute a set of instructions to control the functional elements of the network node to perform the described functions. Additionally, or alternatively, the network node may perform aspects of the described functions using special-purpose hardware.

At 1805, the method may include communicating with (e.g., transmitting to, receiving from, or both) a first UE via a first wireless link according to a first beam configuration that identifies a first beam. The operations of 1805 may be performed in accordance with examples as disclosed herein. In some examples, aspects of the operations of 1805 may be performed by a link communication component 1125 as described with reference to FIG. 11.

At 1810, the method may include obtaining (e.g., receiving), from the first UE via a second wireless link between the first UE and a second UE and via a third wireless link between the network node and the second UE, a BFR message identifying a beam failure at the first UE for the first beam associated with the first wireless link. The operations of 1810 may be performed in accordance with examples as disclosed herein. In some examples, aspects of the operations of 1810 may be performed by an BFR message reception component 1130 as described with reference to FIG. 11.

At 1815, the method may include outputting (e.g., transmitting), at least in part in response to the obtained BFR message, a control message indicating a second beam configuration for the first UE to use to communicate with the network node. The operations of 1815 may be performed in accordance with examples as disclosed herein. In some examples, aspects of the operations of 1815 may be performed by a control message transmission component 1135 as described with reference to FIG. 11.

At 1820, the method may include obtaining (e.g., receiving), from the first UE via the second UE, a hand over message indicating handover for the first UE to a second network node. The operations of 1820 may be performed in accordance with examples as disclosed herein. In some examples, aspects of the operations of 1820 may be performed by a handover message reception component 1140 as described with reference to FIG. 11.

At 1825, the method may include canceling communication traffic with the first UE based on obtaining the hand over message. The operations of 1825 may be performed in accordance with examples as disclosed herein. In some examples, aspects of the operations of 1825 may be performed by a link communication component 1125 as described with reference to FIG. 11.

The following provides an overview of aspects of the present disclosure:

Aspect 1: A method for wireless communications at a first UE, comprising: communicating with a network node via a first wireless link using a first beam according to a first beam configuration; transmitting, to the network node via a second wireless link with a second UE, a BFR message in response to identifying a beam failure for the first beam associated with the first wireless link; and receiving, at least in part in response to the BFR message, a control message indicating a second beam configuration for the first UE to use to communicate with the network node.

Aspect 2: The method of aspect 1, further comprising: transmitting the BFR message to the second UE for the second UE to forward to the network node based at least in part on identifying the second UE for sidelink communication via the second wireless link before identifying a new candidate SSB beam associated with the network node.

Aspect 3: The method of any of aspects 1 through 2, wherein transmitting the BFR message further comprises: transmitting the BFR message to the second UE on the second wireless link for the second UE to forward to the network node based at least in part on identifying that the first UE failed to receive a BFR response to one or more BFR messages transmitted to the network node.

Aspect 4: The method of any of aspects 1 through 3, wherein the second beam configuration comprises SCI, a set of resource pools, a PSFCH configuration, a set of power control parameters, a set of TCI states, or any combination thereof, for the second wireless link with the second UE.

Aspect 5: The method of any of aspects 1 through 4, wherein the network node comprises a first network node, the method further comprising: transmitting, to the second UE on the second wireless link for the second UE to forward to the network node, a message indicating handover of the first UE to a second network node based at least in part on identifying a new cell separate from the network node for the first UE.

Aspect 6: The method of any of aspects 1 through 5, wherein the network node comprises a first network node, the method further comprising: performing a random access procedure with a second network node via a RACH; and transmitting, to the first network node, a message cancelling communications with the first network node based on performing the random access procedure with the second network node.

Aspect 7: The method of any of aspects 1 through 6, further comprising: receiving, from the network node, control signaling indicating a set of sidelink-capable UEs; and selecting to transmit the BFR message to the second UE from the set of sidelink-capable UEs indicated by the control signaling.

Aspect 8: The method of aspect 7, wherein the set of sidelink-capable UEs are ordered according to a sidelink quality metric.

Aspect 9: The method of any of aspects 7 through 8, further comprising: receiving, from the network node, a control signaling indicating a parameter for communications between the first UE and one or more UEs of the set of sidelink-capable UEs.

Aspect 10: The method of aspect 9, wherein the parameter comprises SCI, a resource pool, a PSFCH configuration, a power control parameter, a TCI state, or any combination thereof.

Aspect 11: The method of any of aspects 1 through 10, wherein transmitting the BFR message further comprises: transmitting, to the second UE, SCI comprising a first bit indicating that the BFR message is associated with a BFR forwarding request, a second bit indicating whether the first UE is within coverage of the network node, or both.

Aspect 12: The method of aspect 11, wherein the SCI further comprises: information identifying a first beam identifier as failed, an indicator of a second beam identifier, a cell identifier associated with the network node, uplink data to forward to the network node, or a combination thereof.

Aspect 13: The method of any of aspects 11 through 12, wherein the second bit indicates that the first UE is outside the coverage of the network node, the SCI further comprising: a cell identifier associated with the network node, a set of indicators identifying SSBs associated with the network node that fail to satisfy a power threshold, or any combination thereof.

Aspect 14: The method of any of aspects 1 through 13, wherein transmitting the BFR message comprises: transmitting the BFR message to the second UE based at least in part on identifying that the first UE failed to receive an acknowledgment to a previously-transmitted BFR message transmitted via sidelink to a third UE.

Aspect 15: The method of any of aspects 1 through 14, further comprising: concurrently transmitting the BFR message via sidelink to a plurality of sidelink UEs, including the second UE.

Aspect 16: The method of any of aspects 1 through 15, further comprising: selecting to transmit the BFR message to the second UE based at least in part on identifying that the second UE and the first UE are associated with a same cell identifier.

Aspect 17: The method of any of aspects 1 through 16, further comprising: receiving, from each UE of a set of neighboring sidelink UEs, a respective link quality metric for a communication link between the UE and the network node; and selecting the second UE from the set of neighboring sidelink UEs based at least in part on the second UE having a link quality metric that satisfies a threshold.

Aspect 18: A method for wireless communications at a second UE, comprising: transmitting a message identifying the second UE and indicating that the second UE has an established communication link between the second UE and a network node; receiving, from a first UE at least in part in response to the transmitted message, a BFR message identifying a beam failure at the first UE for a first beam associated with a first wireless link between the first UE and the network node; and transmitting, to the network node, the BFR message received from the first UE.

Aspect 19: The method of aspect 18, wherein transmitting the message further comprises: transmitting a link quality metric associated with the established communication link between the second UE and the network node.

Aspect 20: The method of any of aspects 18 through 19, wherein receiving the BFR message further comprises: receiving SCI comprising a first bit indicating a BFR forwarding request, a second bit indicating whether the first UE is within coverage of the network node, or both.

Aspect 21: The method of aspect 20, wherein the SCI further comprises: information identifying a first beam identifier as failed, an indicator of a second beam identifier, a cell identifier associated with the network node, uplink data to forward to the network node, or a combination thereof.

Aspect 22: The method of any of aspects 20 through 21, wherein the second bit indicates that the first UE is outside the coverage of the network node, the SCI further comprising: a cell identifier associated with the network node, a set of SSBs associated with the network node with respective reference signal received powers satisfying a threshold, or a combination thereof.

Aspect 23: The method of any of aspects 18 through 22, further comprising: receiving, from the network node, a RRC signal indicating for the second UE to relay traffic between the network node and the first UE; and communicating traffic between the network node and the first UE in accordance with receiving the RRC signal.

Aspect 24: The method of any of aspects 18 through 23, further comprising: receiving, from the first UE, a handover message indicating handover for the first UE to a second network node; and transmitting, to the network node, the handover message received from the first UE.

Aspect 25: A method for wireless communications at a network node, comprising: communicating with a first UE via a first wireless link according to a first beam configuration that identifies a first beam; obtaining, from the first UE via a second wireless link between the first UE and a second UE and via a third wireless link between the network node and the second UE, a BFR message identifying a beam failure at the first UE for the first beam associated with the first wireless link; and outputting, at least in part in response to the obtained BFR message, a control message indicating a second beam configuration for the first UE to use to communicate with the network node.

Aspect 26: The method of aspect 25, wherein outputting the control message further comprises: outputting, to the first UE via the third wireless link, the control message indicating the second beam configuration for the first UE to use to communicate with the network node, wherein the second beam configuration comprises a second beam.

Aspect 27: The method of any of aspects 25 through 26, wherein outputting the control message further comprises: outputting, to the second UE, a RRC signal indicating for the second UE to relay traffic between the network node and the first UE; and communicating the traffic, with the first UE via the second UE in accordance with outputting the RRC signal.

Aspect 28: The method of any of aspects 25 through 27, further comprising: obtaining, from the first UE via the second UE, a hand over message indicating handover for the first UE to a second network node; and canceling communication traffic with the first UE based at least in part on obtaining the hand over message.

Aspect 29: The method of any of aspects 25 through 28, further comprising: obtaining, from a second network node, a hand over message indicating handover for the first UE to the second network node; and canceling communication traffic with the first UE based at least in part on obtaining the hand over message.

Aspect 30: An apparatus for wireless communications at a first UE, comprising a processor; memory coupled with the processor; and instructions stored in the memory and executable by the processor to cause the apparatus to perform a method of any of aspects 1 through 17.

Aspect 31: An apparatus for wireless communications at a first UE, comprising at least one means for performing a method of any of aspects 1 through 17.

Aspect 32: A non-transitory computer-readable medium storing code for wireless communications at a first UE, the code comprising instructions executable by a processor to perform a method of any of aspects 1 through 17.

Aspect 33: An apparatus for wireless communications at a second UE, comprising a processor; memory coupled with the processor; and instructions stored in the memory and executable by the processor to cause the apparatus to perform a method of any of aspects 18 through 24.

Aspect 34: An apparatus for wireless communications at a second UE, comprising at least one means for performing a method of any of aspects 18 through 24.

Aspect 35: A non-transitory computer-readable medium storing code for wireless communications at a second UE, the code comprising instructions executable by a processor to perform a method of any of aspects 18 through 24.

Aspect 36: An apparatus for wireless communications at a network node, comprising a processor; memory coupled with the processor; and instructions stored in the memory and executable by the processor to cause the apparatus to perform a method of any of aspects 25 through 29.

Aspect 37: An apparatus for wireless communications at a network node, comprising at least one means for performing a method of any of aspects 25 through 29.

Aspect 38: A non-transitory computer-readable medium storing code for wireless communications at a network node, the code comprising instructions executable by a processor to perform a method of any of aspects 25 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a first user equipment (UE), comprising:
    a processor;
    memory coupled with the processor; and
    instructions stored in the memory and executable by the processor to cause the apparatus to:
        communicate with a network node via a first wireless link using a first beam according to a first beam configuration;
        transmit, to the network node via a second wireless link with a second UE, a beam failure recovery message in response to identifying a beam failure for the first beam associated with the first wireless link; and
        receive, at least in part in response to the beam failure recovery message, a control message indicating a second beam configuration for the first UE to use to communicate with the network node;
        wherein the instructions are further executable by the processor to transmit the beam failure recovery message by being executable by the processor to transmit the beam failure recovery message to the second UE on the second wireless link for the second UE to forward to the network node based at least in part on:
            identification of the second UE for sidelink communication via the second wireless link before identification of a new candidate synchronization signal block beam associated with the network node; or
            identification that the first UE failed to receive a beam failure recovery response to one or more beam failure recovery messages transmitted to the network node.

2. The apparatus of claim 1, wherein the instructions are further executable by the processor to transmit the beam failure recovery message by being executable by the processor to:

transmit the beam failure recovery message to the second UE for the second UE to forward to the network node based at least in part on identification of the second UE for sidelink communication via the second wireless link before identification of the new candidate synchronization signal block beam associated with the network node.

3. The apparatus of claim 1, wherein the instructions are further executable by the processor to transmit the beam failure recovery message by being executable by the processor to:
transmit the beam failure recovery message to the second UE on the second wireless link for the second UE to forward to the network node based at least in part on identification that the first UE failed to receive the beam failure recovery response to the one or more beam failure recovery messages transmitted to the network node.

4. The apparatus of claim 1, wherein the second beam configuration comprises sidelink control information, a set of resource pools, a physical sidelink feedback channel configuration, a set of power control parameters, a set of transmission configuration indication states, or any combination thereof, for the second wireless link with the second UE.

5. The apparatus of claim 1, wherein the network node comprises a first network node, and the instructions are further executable by the processor to:
transmit, to the second UE on the second wireless link for the second UE to forward to the network node, a message indicating handover of the first UE to a second network node based at least in part on identifying a new cell separate from the network node for the first UE.

6. The apparatus of claim 1, wherein the network node comprises a first network node, and the instructions are further executable by the processor to:
perform a random access procedure with a second network node via a random access channel; and
transmit, to the first network node, a message cancelling communications with the first network node based on performing the random access procedure with the second network node.

7. The apparatus of claim 1, wherein the instructions are further executable by the processor to:
receive, from the network node, control signaling indicating a set of sidelink-capable UEs; and
select to transmit the beam failure recovery message to the second UE from the set of sidelink-capable UEs indicated by the control signaling.

8. The apparatus of claim 7, wherein the set of sidelink-capable UEs are ordered according to a sidelink quality metric.

9. The apparatus of claim 7, wherein the instructions are further executable by the processor to:
receive, from the network node, a control signaling indicating a parameter for communications between the first UE and one or more UEs of the set of sidelink-capable UEs.

10. The apparatus of claim 9, wherein the parameter comprises sidelink control information, a resource pool, a physical sidelink feedback channel configuration, a power control parameter, a transmission configuration indication state, or any combination thereof.

11. The apparatus of claim 1, wherein the instructions are further executable by the processor to transmit the beam failure recovery message by being executable by the processor to:
transmit, to the second UE, sidelink control information comprising a first bit indicating that the beam failure recovery message is associated with a beam failure recovery forwarding request, a second bit indicating whether the first UE is within coverage of the network node, or both.

12. The apparatus of claim 11, wherein the sidelink control information further comprises:
information identifying a first beam identifier as failed, an indicator of a second beam identifier, a cell identifier associated with the network node, uplink data to forward to the network node, or a combination thereof.

13. The apparatus of claim 11, wherein the second bit indicates that the first UE is outside the coverage of the network node, the sidelink control information further comprising:
a cell identifier associated with the network node, a set of indicators identifying synchronization signal blocks associated with the network node that fail to satisfy a power threshold, or any combination thereof.

14. The apparatus of claim 1, wherein the instructions are further executable by the processor to transmit the beam failure recovery message by being executable by the processor to:
transmit the beam failure recovery message to the second UE based at least in part on identifying that the first UE failed to receive an acknowledgment to a previously-transmitted beam failure recovery message transmitted via sidelink to a third UE.

15. The apparatus of claim 1, wherein the instructions are further executable by the processor to:
concurrently transmit the beam failure recovery message via sidelink to a plurality of sidelink UEs, including the second UE.

16. The apparatus of claim 1, wherein the instructions are further executable by the processor to:
select to transmit the beam failure recovery message to the second UE based at least in part on identifying that the second UE and the first UE are associated with a same cell identifier.

17. The apparatus of claim 1, wherein the instructions are further executable by the processor to:
receive, from each UE of a set of neighboring sidelink UEs, a respective link quality metric for a communication link between the UE and the network node; and
select the second UE from the set of neighboring sidelink UEs based at least in part on the second UE having a link quality metric that satisfies a threshold.

18. An apparatus for wireless communications at a second user equipment (UE), comprising:
a processor;
memory coupled with the processor; and
instructions stored in the memory and executable by the processor to cause the apparatus to:
transmit a message identifying the second UE and indicating that the second UE has an established communication link between the second UE and a network node;
receive, from a first UE at least in part in response to the transmitted message, a beam failure recovery message identifying a beam failure at the first UE for a first beam associated with a first wireless link between the first UE and the network node, wherein the instructions are further executable by the processor to receive the beam failure recovery message by being executable by the processor to receive sidelink control information comprising a first bit indicating a beam failure recovery forwarding request, a second bit indicating whether the first UE is within coverage of the network node, or both; and transmit, to the network node, the beam failure recovery message received from the first UE.

19. The apparatus of claim 18, wherein the instructions are further executable by the processor to transmit the by being executable by the processor to:

transmit a link quality metric associated with the established communication link between the second UE and the network node.

20. The apparatus of claim 18, wherein the sidelink control information comprises the first bit indicating a beam failure recovery forwarding request and the second bit indicating whether the first UE is within coverage of the network node.

21. The apparatus of claim 20, wherein the sidelink control information further comprises:

information identifying a first beam identifier as failed, an indicator of a second beam identifier, a cell identifier associated with the network node, uplink data to forward to the network node, or a combination thereof.

22. The apparatus of claim 20, wherein the second bit indicates that the first UE is outside the coverage of the network node, the sidelink control information further comprising:

a cell identifier associated with the network node, a set of synchronization signal blocks associated with the network node with respective reference signal received powers satisfying a threshold, or a combination thereof.

23. The apparatus of claim 18, wherein the instructions are further executable by the processor to:

receive, from the network node, a radio resource control signal indicating for the second UE to relay traffic between the network node and the first UE; and communicate traffic between the network node and the first UE in accordance with receiving the radio resource control signal.

24. The apparatus of claim 18, wherein the instructions are further executable by the processor to:

receive, from the first UE, a handover message indicating handover for the first UE to a second network node; and transmit, to the network node, the handover message received from the first UE.

25. An apparatus for wireless communications at a network node, comprising:

a processor;

memory coupled with the processor; and instructions stored in the memory and executable by the processor to cause the apparatus to:

communicate with a first user equipment (UE) via a first wireless link according to a first beam configuration that identifies a first beam;

obtain, from the first UE via a second wireless link between the first UE and a second UE and via a third wireless link between the network node and the second UE, a beam failure recovery message identifying a beam failure at the first UE for the first beam associated with the first wireless link; and output, to the first UE via the third wireless link and at least in part in response to the obtained beam failure recovery message, a control message indicating a second beam configuration for the first UE to use to communicate with the network node, wherein the second beam configuration comprises a second beam.

26. The apparatus of claim 25, wherein the instructions are further executable by the processor to output the control message by being executable by the processor to:

output, to the second UE, a radio resource control signal indicating for the second UE to relay traffic between the network node and the first UE; and communicate the traffic, with the first UE via the second UE in accordance with outputting the radio resource control signal.

27. The apparatus of claim 25, wherein the instructions are further executable by the processor to:

obtain, from the first UE via the second UE, a hand over message indicating handover for the first UE to a second network node; and cancel communication traffic with the first UE based at least in part on obtaining the hand over message.

28. The apparatus of claim 25, wherein the instructions are further executable by the processor to:

obtain, from a second network node, a hand over message indicating handover for the first UE to the second network node; and cancel communication traffic with the first UE based at least in part on receiving the hand over message.

29. A method for wireless communications at a first user equipment (UE), comprising:

communicating with a network node via a first wireless link using a first beam according to a first beam configuration;

transmitting, to the network node via a second wireless link with a second UE, a beam failure recovery message in response to identifying a beam failure for the first beam associated with the first wireless link; and receiving, at least in part in response to the beam failure recovery message, a control message indicating a second beam configuration for the first UE to use to communicate with the network node;

wherein transmitting the beam failure recovery message comprises transmitting the beam failure recovery message to the second UE on the second wireless link for the second UE to forward to the network node based at least in part on:

identifying the second UE for sidelink communication via the second wireless link before identifying a new candidate synchronization signal block beam associated with the network node; or identifying that the first UE failed to receive a beam failure recovery response to one or more beam failure recovery messages transmitted to the network node.

* * * * *